United States Patent
Skaaning et al.

(10) Patent No.: US 6,535,865 B1
(45) Date of Patent: Mar. 18, 2003

(54) AUTOMATED DIAGNOSIS OF PRINTER SYSTEMS USING BAYESIAN NETWORKS

(75) Inventors: Claus Skaaning, Dronninglund (DK); Finn V. Jensen, Broenderslev (DK); Uffe Kjærulff, Aalborg (DK); Paul A. Pelletier, Boise, ID (US); Lasse Rostrup Jensen, Aalborg (DK); Marilyn A. Parker, Boise, ID (US); Janice L. Boborad, Allerfd (DK)

(73) Assignee: Hewlett Packard Company, Palo Alto, CA (US)

( * ) Notice: Subject to any disclaimer, the term of this patent is extended or adjusted under 35 U.S.C. 154(b) by 0 days.

(21) Appl. No.: 09/353,727

(22) Filed: Jul. 14, 1999

(51) Int. Cl.$^7$ ............................................... G06F 15/18
(52) U.S. Cl. ........................ 706/52; 704/270; 370/389
(58) Field of Search ..................... 706/15, 60; 704/270; 370/389

(56) References Cited

U.S. PATENT DOCUMENTS

| | | | | |
|---|---|---|---|---|
| 5,133,046 A | * | 7/1992 | Kaplan ......................... | 706/52 |
| 5,488,725 A | * | 1/1996 | Turtle et al. .................... | 707/5 |
| 5,748,850 A | * | 5/1998 | Sakurai ......................... | 706/50 |
| 5,987,415 A | * | 11/1999 | Breese et al. ................ | 704/270 |
| 6,185,534 B1 | * | 2/2001 | Breese et al. ................ | 704/270 |
| 6,212,502 B1 | * | 4/2001 | Ball et al. ..................... | 704/270 |
| 6,336,108 B1 | * | 1/2002 | Thiesson et al. .............. | 706/20 |
| 6,345,265 B1 | * | 2/2002 | Thiesson et al. .............. | 706/52 |
| 6,408,290 B1 | * | 6/2002 | Thiesson et al. .............. | 706/52 |
| 6,456,622 B1 | * | 9/2002 | Skaanning et al. ......... | 370/389 |

OTHER PUBLICATIONS

Sensitivity analysis for probability assessments in Bayesian networks, Laskey, K.B.; Systems, Man and Cybernetics, IEEE Transactions on, vol.: 25 Issue: 6, Jun. 1995, pp.: 901–909.*

Decision–theoretic case–based reasoning, Breese, J.S.; Heckerman, D.; Systems, Man and Cybernetics, Part A, IEEE Transactions on, vol.: 26 Issue: 6, Nov. 1996, pp: 838–842.*

Distributed data mining of probabilistic knowledge, Lam, W.; Segre, A.M.; Distributed Computing Systems, 1997., Proceedings of the 17$^{th}$ International Conference on, 1997, pp.: 178–185.*

Bayesian network refinement via machine learning approach, Wai Lam; Pattern Analysis and Machine Intelligence, IEEE Transactions on, vol.: 20 Issue: 3, Mar. 1998, pp.: 240–251.*

Breese J.S., et al., "Decision–Theoretic Case–Based Reasoning" IEEE Transactions on Systems, Man & Cybernetics, Part A: Systems & Humans, US, IEEE Service Center, vol. 26, No. 6, Nov. 01, 1996, pp. 838–842.

A. Mishra, et al., "Bayesian Belief Networks 1,6 for Effective Troubleshooting", Proceedings of International Conference on Neural Networks, vol. 5, Jul. 10, 1999, pp 3425–3429.

H. Kirsch, et al., "Applying Bayesian Networks to Fault Diagnosis", Proceedings of the IEEE International Conference on Control & Applications, vol. 2, Aug. 24, 1994, pp. 895–900.

(List continued on next page.)

*Primary Examiner*—John A. Follansbee
*Assistant Examiner*—Michael B. Holmes

(57) ABSTRACT

An automated troubleshooter uses Bayesian networks to troubleshoot a system. Knowledge acquisition is performed in preparation to troubleshoot the system. An issue to troubleshoot is identified. Causes of the issue are identified. Subcauses of the causes are identified. Troubleshooting steps are identified. Troubleshooting steps are matched to causes and subcauses. Probabilities for the causes and the subcauses identified are estimated. Probabilities for actions and questions set are estimated. Costs for actions and questions are estimated.

37 Claims, 19 Drawing Sheets

OTHER PUBLICATIONS

J. Lauber, et al., "Autonomoys Agents For Online Diagnosis of a Safety Critical System Based on Probabilistic Casual Reasoning", Proceedings of ISADS 99. Fourth International Symposium on Autonomous Decentralized Systems, Mar. 21, 1999, pp. 213–219.

G. Agre, "Diagnostic Bayesian Networks", Computers & Artificial Intelligence, vol. 16, No. 1, 1997, pp. 47–67.

de Kleer, J. and Williams, B., "Diagnosing multiple faults", in *Artificial Intelligence*, 32:97–130 (1987).

Heckerman, D., Breese, J., and Rommelse, K., "Decision–theoretic Troubleshooting," in *Communications of the ACM*, 38:49–57 (1995).

Lauritzen, S.L., and Spiegelhalter, D.J., "Local Computations with Probabilities on Graphical Structures and their Applications to Expert Systems," *Journal of the Royal Statistical Society, Series B*, 50(2): 157–224 (1988).

Jensen, F.V., Lauritzen, S. L., and Olesen, K.G., "Bayesian Updating in Casual Probabilistic Networks by Local Computations," in *Computational Statistics Quarterly*, 4:269–282, (1990).

Breese, J.S. and Heckerman, D. "Decision–theoretic Troubleshooting: A Framework for Repair and Experiment", *Technical Report MSR–TR–96–06*, Microsoft Research, Advanced Technology Division, Microsoft Corporation, Redmond, USA (1996).

Henrion, M., Pradhan, M., delFavero, B., Huang, K., Provan, G., and O'Rorke, P., "Why is Diagnosis using Belief Networks Insensitive to Imprecision in Probabilities?", *Proceedings of the Twelfth Conference on Uncertainty in Artificial Intelligence*, (1996).

\* cited by examiner

AUTOMATED DIAGNOSIS OF PRINTER SYSTEMS USING BAYESIAN NETWORKS

RELATED APPLICATION

The subject matter of the present patent application is related to the subject matter set out by Claus Skaaning, Uffe Kjaerulff and Finn V. Jensen in a co-pending patent application Ser. No. 09/261,769, filed on Mar. 3, 1999 for A METHOD FOR KNOWLEDGE ACQUISITION FOR DIAGNOSTIC BAYESIAN NETWORKS, assigned to the same assignee.

BACKGROUND

The present invention pertains to support of printers and pertains particularly to the automated diagnosis of printer systems using Bayesian Networks.

Currently, it is highly expensive for printer manufacturers to diagnose the systems of their customers. Typically, a customer calls a printer call agent at the manufacturer. This call agent guides the customer through a troubleshooting sequence that leads to resolution of the problem or identification of the cause. This method requires the intervention of a call agent which results in a high cost.

When using call agents the printer manufacturer hires many call-agents which the customer in turn can call when he experiences problems with his printer system. The call-agent attempts to gather as much information as possible by interviewing the customer over the phone. When he reaches the conclusion, he will either have solved the problem, identified the cause, or had to dispatch a field agent that will attempt to resolve the problem at the customer site.

One drawback of using call-agents is the expense. In addition, there can be problems with consistency in the order and types of troubleshooting steps used by different call agents. It is a problem if customers are not given approximately the same troubleshooting steps in the same order with similar problems, as they may then feel confused. Also, the call agent solution allows only limited logging of information, has only limited integration of programmatic data-collectors, and very limited integration of multi-media presentations. Use of call-agents however, does provide the benefit of human-to-human communication between the call agent and the customer as the call agent will obviously be able to detect soft information that a computer-based system cannot easily detect, such as, e.g., whether the customer is irritated with some line of questioning, the level of experience of the customer, and so on.

Decision trees can be used to provide automated diagnosis of printer systems. The decision-tree approach specifies the possible troubleshooting sequences as a so-called decision tree. At each branching of the tree, one of the branches will be chosen based on the information provided by the customer at the last step. However, decision-trees are static in the sense that for practical reasons it only allows a limited number of possible sequences of the troubleshooting steps. With decision-trees all sequences that should be available to the customer have to be encoded and as the size of the decision tree is exponential in the number of these, it is only possible to encode a limited number of them. This on the average will cause the decision tree to provide longer troubleshooting sequences with lower probability of actually diagnosing the problem, as it is not possible to take all possible scenarios into account.

Case-based reasoning can also be used to provide automated diagnosis of printer systems. The case-based approach gathers a high amount of descriptive cases from troubleshooting scenarios where various problems are seen. Based on information about the current situation, the case-based reasoning engine can then select the cases that are most similar. The most similar cases are then investigated to find the best next action or question that has the highest likelihood to rule out as many cases as possible. This continues until the single case that matches most the current situation is determined.

Case-based systems gather cases that are descriptive of the troubleshooting domain and use these cases to suggest actions and questions that as quickly as possible narrows the scope down to a single case. The quality of a case-based system hinges on its case database which has to be very large to adequately describe a printer system domain. The possible configurations/cases in a printer system can be at least 21,000, if all the variables are binary. A subset of cases out of these would have to be extremely large to be sufficiently descriptive to be useful to a case-based system. Thus, it is doubtful that case-based systems will be successful in representing the printing system with its many variables to an optimal level of accuracy.

Rule-based systems can also be used to provide automated diagnosis of printer systems. Rule-based systems can be perceived as a subset of Bayesian networks, as they can be represented with Bayesian networks. They have a subset of the modeling capabilities of Bayesian networks, and the belief updating methods are not guaranteed correct as they are with Bayesian networks.

Rule-based systems, however, have updating methods that are not optimal when there are loops in the model. Loops are very common in models of real-world systems (e.g., common causes, troubleshooting steps that fixes several causes, etc.).

One troubleshooter based on Bayesian networks is described by Heckerman, D., Breese, J., and Rommelse, K. (1995), *Decision-theoretic Troubleshooting, Communications of the ACM*, 38:49–57 (herein "Heckerman et al. 1995").

A Bayesian network is a directed acyclic graph representing the causal relationships between variables, that associates conditional probability distributions to variables given their parents. Efficient methods for exact updating of probabilities in Bayesian networks have been developed. See for example, Lauritzen, S. L., and Spiegelhalter, D. J. Local Computations with Probabilities on Graphical Structures and their Applications to Expert Systems. *Journal of the Royal Statistical Society, Series B*, 50(2):157–224 (1988), and Jensen, F. V., Lauritzen, S. L., and Olesen, K. G., *Bayesian Updating in Causal Probabilistic Networks bu. Local Computations, Computational Statistics Quarterly*, 4:269–282 (1990). Efficient methods for exact updating of probabilities in Bayesian networks have been implemented in the HUGIN expert system. See Andersen, S. K., Olesen, K. G., Jensen, F. V. and Jensen, F., *HUGIN—a Shell for Building Bayesian Belief Universes for Expert Systems, Proceedings of the Eleventh International Joint Conference on Artificial Intelligence*. (1989).

Bayesian networks provide a way to model problem areas using probability theory. The Bayesian network representation of a problem can be used to provide information on a subset of variables given information on others. A Bayesian network consists of a set of variables (nodes) and a set of directed edges (connections between variables). Each variable has a set of mutually exclusive states. The variables together with the directed edges form a directed acyclic graph (DAG). For each variable v with parents $w_1, \ldots, w_n$, there is defined a conditional probability table $P(v|w_1, \ldots, w_n)$. Obviously, if v has no parents, this table reduces to the marginal probability $P(v)$.

Bayesian networks have been used in many application domains with uncertainty, such as medical diagnosis, pedigree analysis, planning, debt detection, bottleneck detection, etc. However, one of the major application areas has been diagnosis. Diagnosis (i.e., underlying factors that cause diseases/malfunctions that again cause symptoms) lends itself nicely to the modeling techniques of Bayesian networks,.

The currently most efficient method for exact belief updating of Bayesian networks is the junction-tree method that transforms the network into a so-called junction tree, described in Jensen, F. V., Lauritzen, S. L., and Olesen, K. G., *Bayesian Updating in Causal Probabilistic Networks by Local Computations, Computational Statistics Quarterly*, 4:269–282 (1990). The junction tree basically clusters the variables such that a tree is obtained (i.e., all loops are removed) and the clusters are as small as possible. In this tree, a message passing scheme can then update the beliefs of all unobserved variables given the observed variables. Exact updating of Bayesian networks is NP-hard (Cooper, G. F., *The Computational Complexity of Probabilistic Inference using Bayesian Belief Networks, Artificial Intelligence*, 42:393–405, (1990)), however, it is still very efficient for some classes of Bayesian networks. The network for the printing system contains several thousand variables and many loops, but can still be transformed to a junction tree with reasonably efficient belief updating.

Heckerman et al. 1995 presents a method for performing sequential troubleshooting based on Bayesian networks.

For a device to troubleshoot that has n components represented by the variables $c_1, \ldots, c_n$, Heckerman et al. 1995 follow the single-fault assumption that requires that exactly one component is malfunctioning and that this component is the cause of the problem. If $p_i$ denotes the probability that component $c_i$ is abnormal given the current state of information, then $\sum_{i=1}^{n} p_i = 1$ under the single-fault assumption. Each component $c_i$ has a cost of observation, denoted $C^o_i$ (measured in time and/or money), and a cost of repair $C^r_i$.

Under some additional mild assumptions not reproduced here (see Heckerman et al. 1995 for more information), it can then be shown that with failure probabilities $p_i$ updated with current information, it is always optimal to observe the component that has the highest ratio $p_i/C^o_i$. This is intuitive, as the ratio balances probability of failure with cost of observation and indicates the component with the highest probability of failure and the lowest cost of observation. Under the single-fault assumption, an optimal observation-repair sequence is thus given by the plan set out in Table 1 below:

TABLE 1

| Step 1: | Compute the probabilities of component faults $p_i$ given that the device is not functioning. |
| Step 2: | Observe the component with the highest ratio $p_i/C^o_i$. |
| Step 3: | If the component is faulty, then repair it. |
| Step 4: | If a component was repaired, then terminate. Otherwise, go to step 1. |

In the plan described in Table 1 above, if a component is repaired in step 3, it is known from the single-fault assumption that the device must be repaired, and the troubleshooting process can be stopped. The algorithm works reasonably well if the single-fault assumption is lifted, in which case step 1 will take into account new information gained in steps 2 and 3, and step 4 will be replaced as in Table 2 below:

TABLE 2

| Step 1: | Compute the probabilities of component faults $p_i$ given that the device is not functioning. |
| Step 2: | Observe the component with the highest ratio $p_i/C^o_i$. |
| Step 3: | If the component is faulty, then repair it. |
| Step 4: | If the device is still malfunctioning, go to step 1. |

Heckerman et al. 1995 introduces a theory for handling a service call that is used when the expected cost of the most optimal troubleshooting sequence is higher than the cost of a service call (e.g., calling the manufacturer for assistance). The theory changes to the above plan that enables it to approximately handle systems with multiple faults and non-base observations. Non-base observations are observations on something that is not a component but potentially provides useful information for the troubleshooting process. In a companion paper (Breese, J. S. and Heckerman, D., *Decision-theoretic Troubleshooting: A Framework for Repair and Experiment*, Technical Report MSR-TR-96-06, (1996) Microsoft Research, Advanced Technology Division, Microsoft Corporation, Redmond, USA), the method is further advanced to also enable configuration changes in the system to provide further useful information that can potentially lower the cost of the optimal troubleshooting sequence.

However, the Bayesian-network based troubleshooters described by Heckerman et al. 1995 have a one-to-one correspondence between causes and actions which does not hold in reality, have myopic (one-step lookahead) selection of questions, and have too slow selection of questions when there are many of them. Furthermore, Heckerman et al. 1995 presents no method of knowledge acquisition for their troubleshooters.

SUMMARY OF THE INVENTION

In accordance with a preferred embodiment of the present invention knowledge acquisition is performed in preparation to troubleshoot a system. An issue to troubleshoot is identified. Causes of the issue are identified. Subcauses of the causes are identified. Troubleshooting steps are identified. Troubleshooting steps are matched to causes and subcauses. Probabilities for the causes and the subcauses identified are estimated. Probabilities for actions and questions set are estimated. Costs for actions and questions are estimated.

In the preferred embodiment of the present invention, actions and questions that require special handling are also identified. Domain experts are used to identify causes of the issue. Troubleshooting steps include actions that can solve any of the causes or subcauses, and questions that provide additional information about causes or subcauses. Each troubleshooting step that includes an action is matched to any cause or subcause the action can solve and each troubleshooting step that includes a question is matched to any cause or subcause to which the question is related.

When estimating costs for actions and questions, a determination is made for each related cause or related subcause as to whether performing a first action correctly will solve the issue. In addition a determination is made as to the likelihood a customer will perform the first action correctly. The costs for the first action can include factors that take into account the time to perform the first action, the risk of breaking something when performing the first action, the amount of money required to purchase any parts necessary to perform the first action, and the degree of insult a user may experience when the first action is suggested.

The troubleshooter utilizes Bayesian networks. For example, a Bayesian network that models a system component causing failure of a system includes an indicator node, a plurality of cause nodes, and a first plurality of troubleshooting nodes. The indicator node has a state that indicates whether the system component is causing a failure. Each cause node represents a cause of the system component producing a failure. Each troubleshooting node represents a troubleshooting step. Each troubleshooting step suggests an action to remedy causes represented by any cause nodes to which the troubleshooting node is coupled. A causes node represents a probability distribution over causes for failure of the system component.

The Bayesian network can additionally include question nodes. A question node represents a question, which when answered, provides potential information about causes represented by any cause nodes to which the question node is coupled. A question node can also represent a question of a general type which is not necessarily related to a symptom or a cause of failure of the system component.

For a first troubleshooting step suggesting a first action, when calculating whether the first action will solve a first cause, an inaccuracy factor can be utilized. The inaccuracy factor represents a probability that a user will incorrectly perform the first action. In the preferred embodiment, at least two cause nodes, from the plurality of cause nodes, can have a common subcause.

For example, the troubleshooter is a printing diagnosis system which utilizes five Bayesian networks. A first Bayesian network handles all errors where a customer does not get output from a printer when attempting to print, and where the customer gets corrupted output. A second Bayesian network handles all errors where the customer gets unexpected output. A third Bayesian network handles all types of errorcodes that can be seen on a control panel of the printer. A fourth Bayesian network handles miscellaneous erroneous behavior of the printer not covered by the first Bayesian network, the second Bayesian network and the third Bayesian network. A fifth Bayesian network represents all possible settings in a printing system for the printer.

The invention presents several new ideas that combine to make the quality of the diagnostic process as high as possible while maintaining the efficiency of the knowledge acquisition as low as possible.

The method for selecting troubleshooting actions and questions used combined with the precise estimates of costs enable the preferred embodiment of the present invention to reach a diagnosis in as few as possible steps.

An automated troubleshooter in accordance with a preferred embodiment of the present invention allows easy logging of customers' troubleshooting sequences, including information obtained programmatically from the customer system, and the outcome of the troubleshooting session (success or failure to diagnose). All this information can be directly logged by an automated troubleshooter with no human labor required.

Additionally, an automated troubleshooter provides for easy integration of programmatic data-collectors. It is relatively easy to improve the interactive gathering of data from the customer with programmatic data-collectors that directly query the customers PC, printer, etc. for relevant data that can be used in the troubleshooting process to speed up the diagnosis.

An automated troubleshooter in accordance with the preferred embodiment of the present invention also provides for easy integration of multi-media presentations. It is possible to utilize multi-media presentations such as graphic pictures and sound to help illustrate problems and guide the customer to the correct selections. Graphic pictures in particular can in many situations greatly simplify the description of problem scenarios and make it much more likely that the customer makes the correct selection.

The preferred embodiment of the present invention presents a knowledge acquisition (authoring) method for constructing automated troubleshooters in a highly efficient manner, by following a clearly defined process. The knowledge acquisition is commonly recognized as the bottleneck of automated troubleshooters as it is usually cumbersome and very time-consuming. The preferred embodiment of an automated troubleshooter in accordance with a preferred embodiment of the present invention puts constraints on the general Bayesian network modeling phase, and only allows very strict simpler structures—thus limiting the scope and increasing the efficiency of the knowledge acquisition.

An automated troubleshooter in accordance with the preferred embodiment has several other advantages. As the troubleshooting is controlled by a computer program, it is possible to log everything that transpires between the troubleshooter and the user. In the situation where the troubleshooter is not able to solve the problem, it will be able to give control to an experienced support agent who can take over the troubleshooting process. This agent will be able to see the log of the previously suggested and performed steps, and the final probabilities on the causes. He can use this information to decide whether skipped steps should be re-suggested, whether performed steps with doubtful answers should be re-suggested, or whether more advanced steps not included in the troubleshooter should be suggested. The automated troubleshooter will then not only cut down on the number of calls that reach support agents, but will also aid the support agents in some of the cases that cannot be handled by it.

The logging of all information also allows fine-tuning of the probabilities and costs in the troubleshooting models, using so-called learning techniques. For someone familiar with the area of Bayesian networks, it is easy to see that probabilities of questions, actions and causes can be improved by the large amounts of information that will be gathered, e.g., the identified causes, question answers, successful or failed actions, etc. Also it will be possible to improve the time component of the cost of actions and questions, simply by measuring the time-span from the step is suggested to it is answered. On the average, over a large number of cases, this will yield the true time requirements of the step.

An automated troubleshooter constructed with Bayesian networks, as described herein solves problems related with the expensive diagnosis of printer systems. The present invention allows users to diagnose many problems themselves, saving the support agents phone calls and cutting down on expenses.

The present invention also improves quality and speed of diagnosis. The invention produces optimal (as short as possible—given weak assumptions) troubleshooting sequences.

The present invention also improves the consistency of diagnosis. The invention also makes progress in removing the knowledge acquisition bottleneck seen in many diagnostic projects by limiting the modeling flexibilities of the troubleshooter builders and defining a clear, well-structured knowledge acquisition process that can be followed without having any knowledge about Bayesian networks.

Compared with the automated troubleshooters suggested by Heckerman et al. 1995, the present invention improves and extends in several aspects. The invention contains a complete method for knowledge acquisition of troubleshooter models, something not presented before. The invention also extends on the algorithms for selecting the best next step in several areas.

DESCRIPTION OF THE PREFERRED EMBODIMENT

Figure 1:
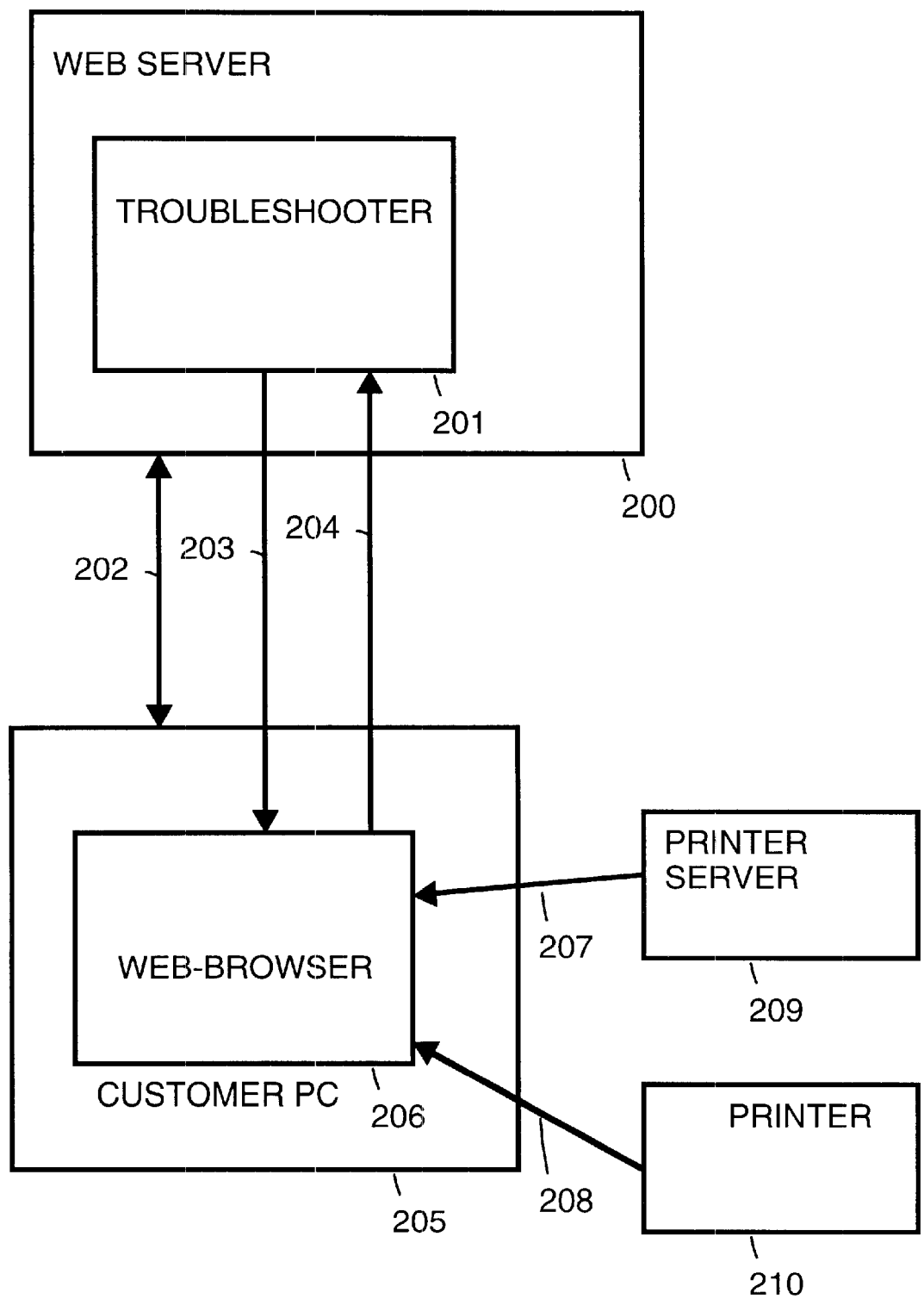
FIG. 1 is an overview of a troubleshooting environment in accordance with a preferred embodiment of the present invention.

FIG. 1 is an overview of a troubleshooting environment in accordance with a preferred embodiment of the present invention.

FIG. 1 shows a web-server 200, a customer personal computer (PC) 205, a printer server 209 and a printer 210. A printer system troubleshooter 201 runs on a web-server 200. A user on customer PC 205 can access troubleshooter 201 over Internet 202. A web-browser 206 within customer PC 205 is used to access web-server 200. In response to the customer's interaction with troubleshooter 201, troubleshooter 201 responds with suggestions 203 for troubleshooting steps that the customer can perform. Troubleshooter 201 essentially functions as an expert system that utilizes artificial intelligence. The customer provides information 204 back to troubleshooter 201 which informs troubleshooter 201 on the outcome from acting on suggestions 203. Information 204 may include information 207 the customer obtains from printer server 209 and/or information 208 the customer obtains from printer 210.

Figure 2:
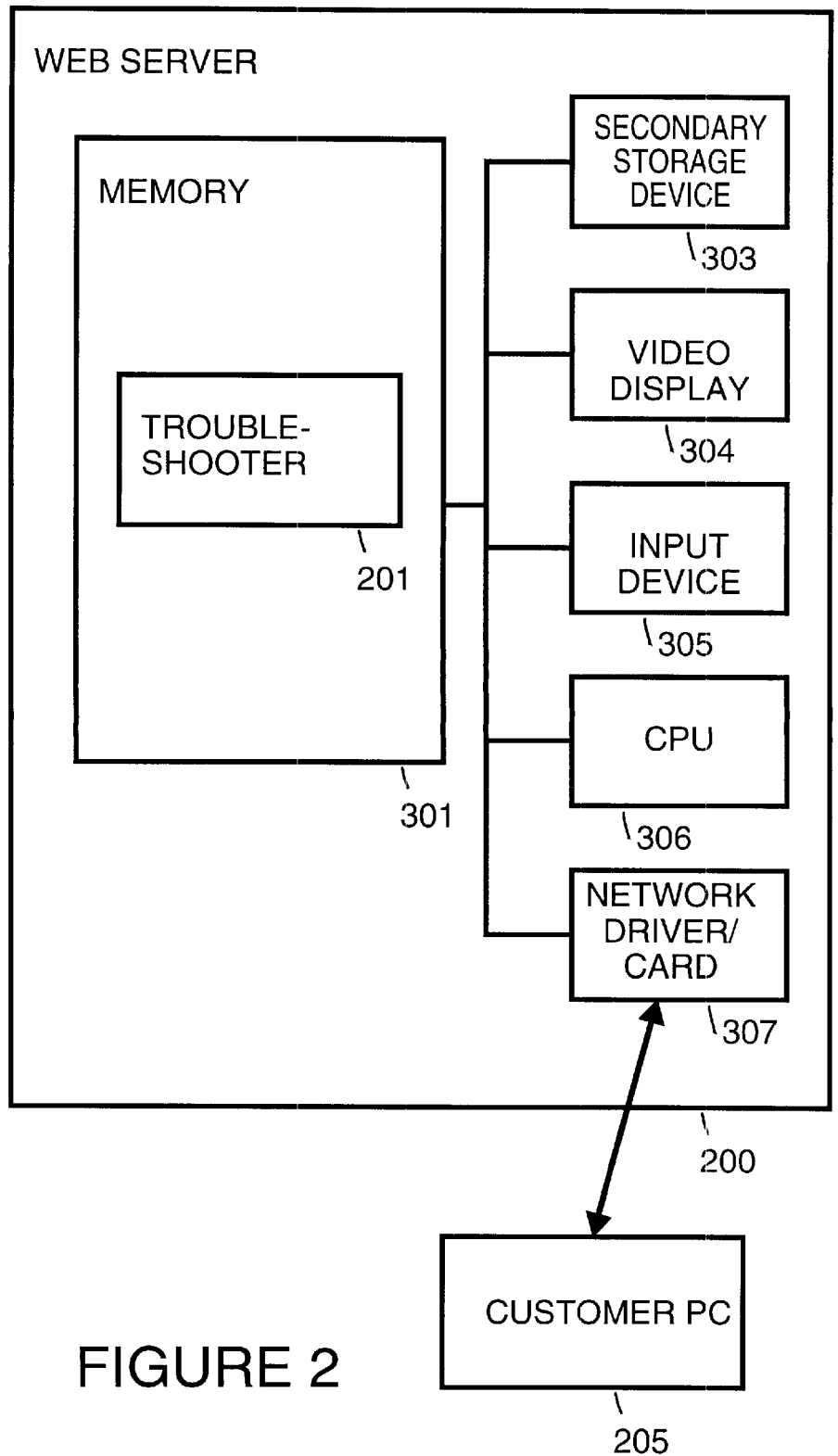
FIG. 2 is a simplified block diagram of a web server in accordance with a preferred embodiment of the present invention.

FIG. 2 is a simplified block diagram of web-server 200. Troubleshooter 201 executes in a memory 301 of web-server 200. Troubleshooter 201 utilizes secondary storage devices 303 for storage of troubleshooting models. A video display 304 can be used by a technician to monitor the troubleshooting process and to maintain the troubleshooting models. Web server 200 also includes an input device 305, such as a keyboard, a CPU 306 and a network card 307 for communication with web-browser 206 in customer PC 205.

Figure 3:
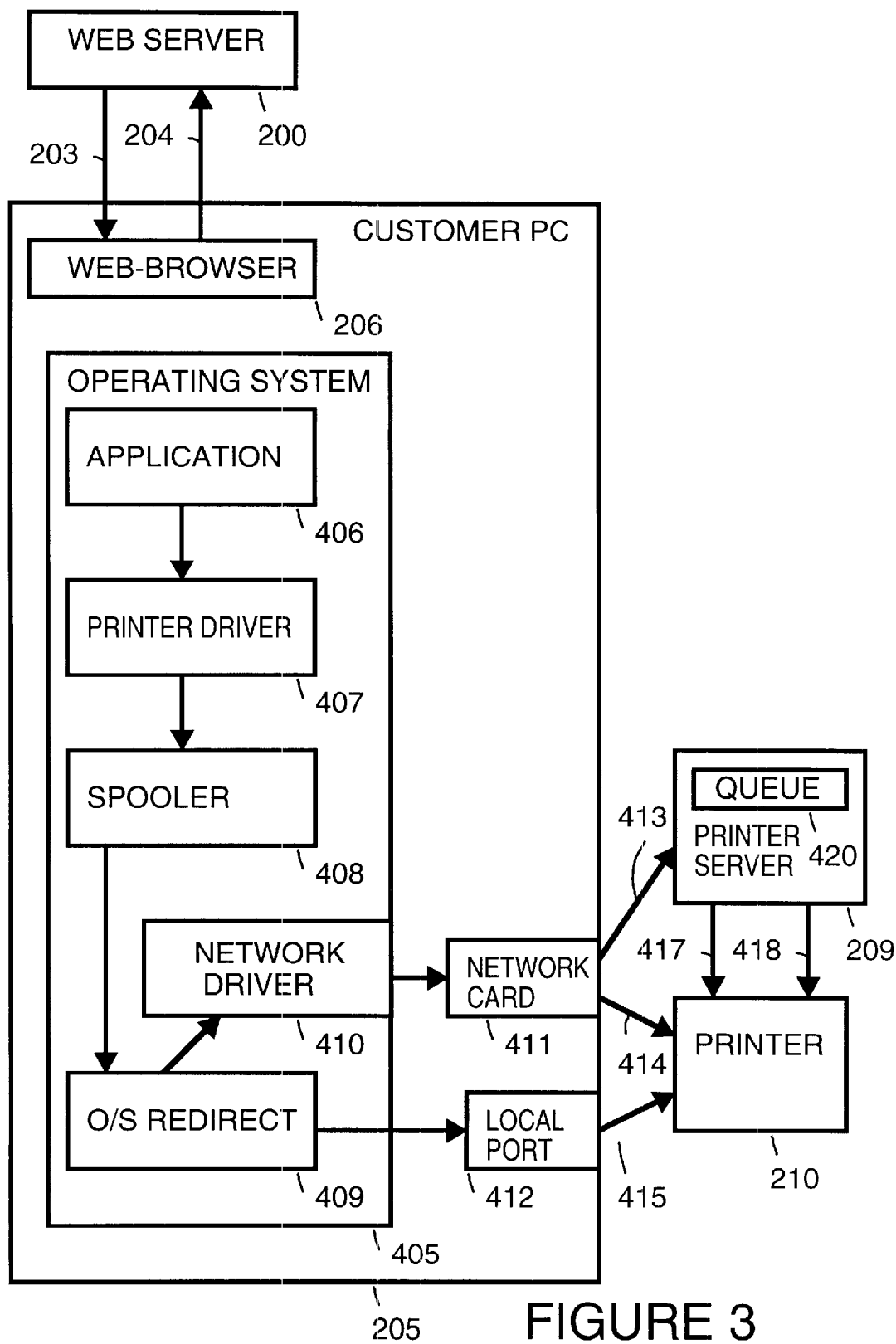
FIG. 3 is a simplified block diagram of components within a customer personal computer used in the troubleshooting process in accordance with a preferred embodiment of the present invention.

FIG. 3 is an overview of the components of the troubleshooting process. Web-server 200 is shown. The customer communicates with troubleshooter 201 (shown in FIG. 1) within web-server 200 through web-browser 206 running on customer PC 401. The customer receives suggestions 203 from troubleshooter 201 and in return provides answers 204. The customer uses troubleshooter 201 when experiencing a malfunction in the printer system which consists of printer server 209 and printer 210. In general, when a customer attempts to print from an application 406, the print job first goes to a printer driver 407, then through a local spooler 408, if utilized, and then to an operating system (O/S) redirect 409. O/S redirect 409 is the part of the operating system that determines which way the print job goes, i.e., to a network connection 413 via a network driver 410 and a network card 411, or to a local port 412 in the case of a local parallel connected printer. If the print job goes to a local parallel connected printer, the print job goes through a parallel cable 415 before reaching printer 210. If the print job goes to a network printer, it either goes through network connection 413 to printer server 209, or through a direct network connection 414 to printer 210. Direct network connection 414 may be utilized for certain printers, e.g., the HP LaserJet 5Si available from Hewlett-Packard Company, having a business Address of 3000 Hanover Street, Palo Alto, Calif. 94304. When printer 210 is controlled by printer server 209, the print job goes through a printer queue 420 printer server 20, and then the print job is sent across either a network connection 417 to printer 210, or a parallel cable 418, depending upon how printer 210 is connected to printer server 209.

Application 406, printer driver 407, spooler 408 and O/S redirect 409 all execute in operating system 405 on customer PC 205. When printing a print job from application 406, the print job follows one of the above-described paths on its way to printer 210, depending on the system setup. If anything goes wrong along the way, this can result in no output or unexpected output. Troubleshooter 201 will, through tests on components in the system, attempt to determine which component(s) caused the problem.

Figure 4:
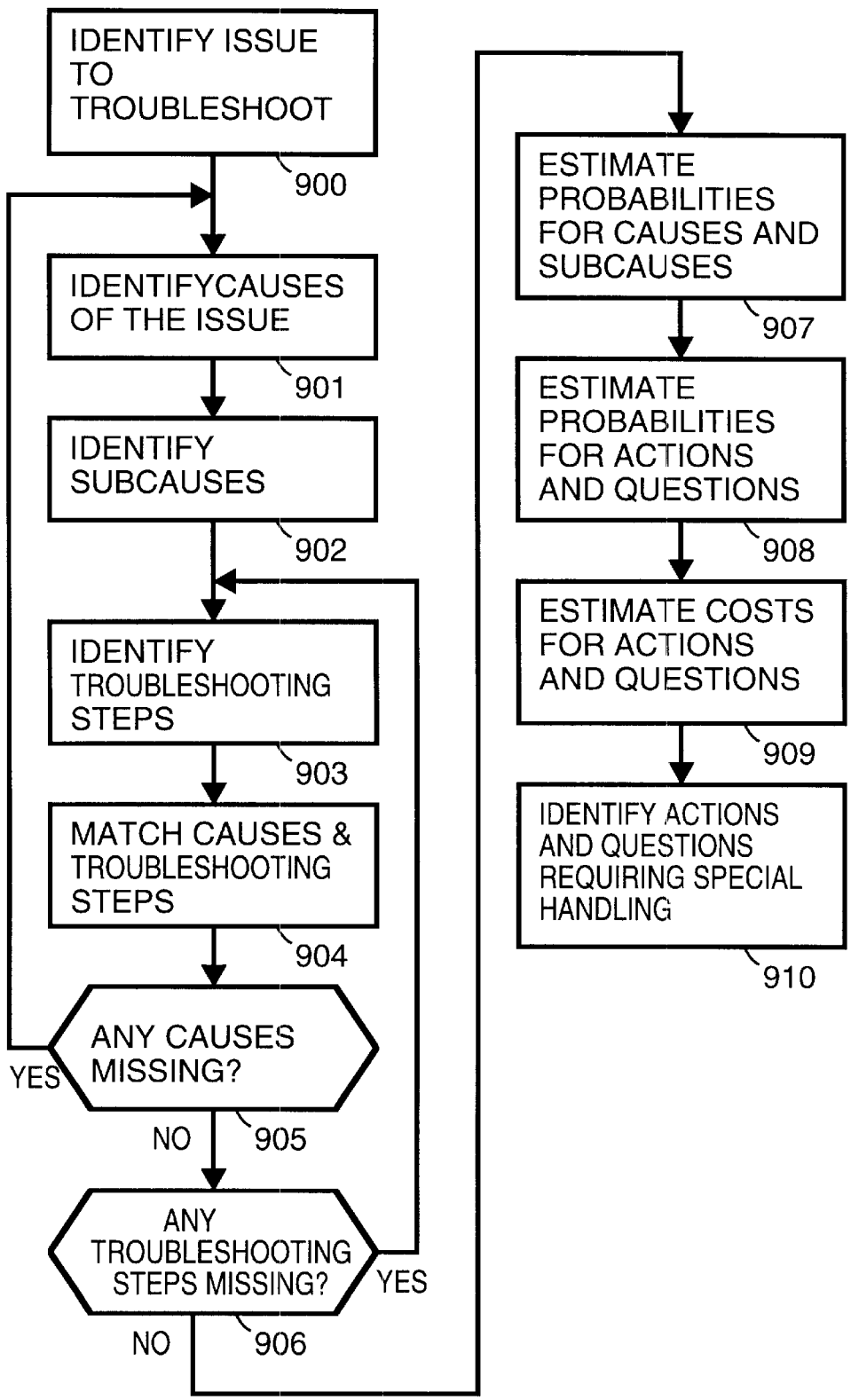
FIG. 4, is an overview of steps to perform knowledge acquisition in accordance with a preferred embodiment of the present invention.

FIG. 4, is an overview of steps to perform knowledge acquisition in order to implement troubleshooter 201. The knowledge acquisition process is the process of constructing the troubleshooting models by gathering sufficient information about the domain from so-called domain experts. The domain experts are familiar with the domain that is being modeled, in this case printer systems. These domain experts have intimate knowledge of the domain under consideration, having assisted in the construction phase, troubleshooting or support phase of the product. The knowledge acquisition process has to be guided by someone familiar with the rules and requirements of the process. Participating in or guiding the knowledge acquisition process requires no expertise in the area of Bayesian networks. To aid in illustration, the problem of "light print" is used as an example throughout discussion of the steps disclosed in FIG. 4. "Light print" is the problem of the user receiving an output from the printer that is lighter than expected.

In a step 900, the issues to trouble shoot are identified. The problem that is being modeled is identified, defined precisely and separated from other problems. Initially, it is very important to precisely define the problem under consideration and the audience of the troubleshooting tool, as this will have a large impact on the following knowledge acquisition steps. The skill level of the audience is important when specifying both causes and steps, as there are causes and steps that cannot be manipulated by end users, but can be manipulated by experienced troubleshooters. In the following, it is assumed that there is an audience of end users that have only rudimentary understanding of the printer system, but can be guided to perform complicated steps.

In a step 901, causes of the issue are identified. In this step, the domain experts identify the causes of the problem under consideration. Causes are basically all the different components, properties or events that can cause the problem.

It is usually impossible and/or not necessary to identify and specify all causes, as there are causes that are too rare to be worth considering e.g., gravity out of specification causing printing problems or causes that cannot be affected by the user anyway e.g., advanced technical problems with printer components. These causes are then gathered in a single leak cause termed "other problems" which further has two subcauses representing respectively "temporary problems" that can be solved by power cycling the printer, and "permanent problems" that cannot be solved by the user.

One of the difficulties in identifying causes is the decision of whether to group sets of causes as a single cause or whether to keep the causes separate. As a rule of thumb it is easier to do the knowledge acquisition for actions, if causes for which there are different actions are kept separate.

For example, for the problem of "light print" the following causes and subcauses were identified as set out in Table 3 below:

TABLE 3

| Cause/Subcause | Explanation |
| --- | --- |
| Media | If the paper is of such a type that the toner doesn't stick correctly to it, this can cause light print. |
| Paper path dirty | If the paper path is dirty there is a chance that this causes lighter print. Environmental conditions - humidity, temperature, etc. can all cause lighter print if they are extreme. |
| Toner cartridge problems | Problems with the toner cartridge can cause lighter print, e.g., if the cartridge is low on toner. |

TABLE 3-continued

| Cause/Subcause | Explanation |
| --- | --- |
| Transfer roller problems | The transfer roller allows the toner image on the drum surface to be transferred to or placed on the media and can thus also cause light print. Incorrect application settings - obviously there are settings that can cause light print, if set incorrectly, both in the application, printer driver and on the control panel of the printer itself |
| Incorrect printer driver settings | |
| Incorrect control panel settings | |
| Corrupt data flow | There is a slight change that the print job can be corrupted somewhere in the flow from the application through the network to the printer, such that it prints out lighter than expected. |
| Wrong driver used | Using the incorrect driver for the printer can cause light print. |
| Other problems | As mentioned above there are causes of light print that it is not worth considering and they are gathered under this heading |

Experience has shown that modeling the causes at this level, closely resembles the manner of thinking employed by experienced printing system call agents. When they troubleshoot printer problems over the phone, they maintain in their minds a list of the causes and subcauses similar to the above, and continually adjust the beliefs of the different causes based on the conversation with the customer.

In a step 902, subcauses, if any, are identified. Often, it is convenient to organize causes into categories. These categories are then seen as causes with a number of subcauses. It is not strictly necessary to use subcauses of causes, as it is entirely possible to have all subcauses on the same top level. However, this approach often leads to a high number of causes on the top level, making the acquisition of probabilities more difficult. Organizing the causes into a hierarchy allows the domain expert to consider fewer causes at a time when estimating probabilities, thus providing more accurate information.

While in FIG. 4 there are only represented two levels of the cause-structure in FIG. 4, there can be arbitrarily many levels of causes and subcauses.

The finished hierarchy of causes for "light print" is as is set out in Table 4 below:

TABLE 4

1) Media
2) Paper path dirty
3) Environmental conditions
4) Toner cartridge problems
   a) Defective toner cartridge
   b) Improperly seated toner cartridge
   c) Toner distribution - this includes low on toner and other problems with the toner fluid.
5) Transfer roller problems
   a) Defective or dirty transfer roller
   b) Improperly seated transfer roller
   c) Worn out transfer roller
6) Incorrect application settings
   a) Economode/draft mode on - economode is set to save toner, and thus causes a lighter print than ordinarily.
   b) 300/600 dpi set to 300 dpi - 300 dpi may cause lighter print than 600 dpi prints.

TABLE 4-continued c) Other settings set wrong - other settings that may cause light print.
7) Incorrect printer driver settings
    a) Economode set on
    b) 300/600 dpi set to 300 dpi
    c) Other settings set wrong
8) Incorrect control panel settings
    a) Economode/draft mode set on
    b) 300/600 dpi set to 300 dpi
    c) Print density set too low
9) Corrupt data flow
10) Wrong driver used
11) Other problems
    a) Temporary problem
    b) Permanent problem In a step 903, troubleshooting steps of the issue are identified. Actions that can solve any of the causes of the problem, and questions that can provide information regarding the causes are listed.

When listing the troubleshooting steps of a problem, the domain experts basically consider the steps they themselves would perform or suggest for the customer to perform, if they were faced with the problem. Experience shows that it is beneficial to start out listing the steps without considering the previously listed causes, i.e., with a "blank" mind, as this will occasionally bring otherwise forgotten steps into mind. Then, when these first steps have been listed, it is good to consider the list of causes and add all steps that potentially solve these causes.

When listing troubleshooting steps, only steps that can be performed by the assumed audience of the troubleshooter should be listed, e.g., if the audience is end users, it is irrelevant to suggest steps that require a high technical understanding of the printing system to be performed successfully. There are also steps that carry a high risk of breaking something else when performed by inexperienced users, that should not be included. Steps that require highly expensive requisites are also steps that should not usually be included.

Again, the domain expert faces the problem of size and coverage of steps. There are troubleshooting procedures that can be equivalently modeled as a single step or a series of steps. The rule of thumb here is that it depends on the user interface and the step itself how to represent a step. If the step can be conveniently represented as a deterministic flow-diagram if-then-else structure, and the user interface of the troubleshooter supports the implementation of such deterministic "programs", then the step should be modeled as a single step. If the flow-diagram of the step includes uncertain/probabilistic decisions, the step has to be represented as multiple steps.

There are two main categories of troubleshooting steps, actions and questions. The first category, actions, are steps that require the user to perform some kind of intervention in the system, and report back to the troubleshooter whether the action solved the problem or not. Thus, actions have the potential to solve the problem. The second category, questions, are steps that require the user to obtain some information related with the problem at hand possibly by intervening with the system, and report back the result to the troubleshooter. Questions are grouped into two subcategories, information-gathering actions and general questions.

Information-gathering actions are actions that do not have the potential to solve the problem. They merely provide information, that is relevant to solving the problem. Ordinary actions are also termed solution actions to distinguish them from the information-gathering actions. It is important to distinguish, as the two types of actions are handled differently in the troubleshooting algorithms, as further described below where information-gathering actions are treated as questions. To clarify, this means that algorithmically there is no difference between information-gathering actions and questions. However, the distinction is kept during knowledge acquisition as it is easier for domain experts to elicit probabilities for information-gathering actions if they are treated as actions.

The distinction between information-gathering and solution actions should also be clarified. Solution actions have the potential to solve the problem while information-gathering actions cannot possibly solve the problem. Information-gathering actions only have the potential to temporarily remove the problem while some change to the environment is tried out.

General questions are the remaining questions that are not information-gathering actions. Questions do not have the potential to solve the problem, and can have any number of answers as opposed to actions that only have two: yes (it helped) and no (it didn't).

When listing the troubleshooting steps of a problem, they must be categorized as either solution actions (SA), information-gathering actions (IA) or questions (Q).

For all actions and questions, explanations should be written as early in the knowledge acquisition process as possible, as these explanations/definitions help to reduce future confusion and ensure that errors are caught as early as possible.

For the "light print" problem, the following steps were identified, as set out in Table 5 below:

TABLE 5

| | |
|---|---|
| A) | Ensure that media is within specifications (SA) |
| B) | Try another toner cartridge that is within specification (IA) |
| C) | Remove, shake and reinsert toner cartridge (SA) |
| D) | Reseat transfer roller (SA) |
| E) | Try different media (IA) |
| F) | Perform printer maintenance kit (SA) |
| G) | Power cycle the printer (SA) |
| H) | Ensure that environmental conditions are within specifications (SA) |
| I) | Clean the inside of the printer according to the user manual (SA) |
| J) | Try another in-spec transfer roller (IA) |
| K) | Ensure economode/draft more is not on in the application (SA) |
| L) | Ensure 300 dpi is not set in the application (SA) |
| M) | Examine and correct other application settings related to "light print" (SA) |
| N) | Ensure economode is not on in the printer driver (SA) |
| O) | Ensure 300 dpi is not set in the printer driver (SA) |
| P) | Examine and correct other printer driver settings related to "light print" (SA) |
| Q) | Ensure economode/draft more is not on on the control panel of the printer (SA) |
| R) | Ensure 300 dpi is not set on the control panel of the printer (SA) |
| S) | Ensure print density is not set too low on the control panel (SA) |
| T) | Troubleshoot the data flow (SA) |
| U) | Ensure that an in-spec up-to-date printer driver is used (SA) |
| V) | Is the printer maintenance kit due? (Q) |
| W) | Is the toner cartridge from a supported manufacturer? (Q) |
| X) | Does the control panel say "Toner low"? (Q) |
| Y) | Is the printer configuration page printed light? (Q) |

A few of the above steps are classified as information-gathering actions, e.g., step B "Try another toner cartridge".

If, after performing step B, the problem is removed, the problem is still not solved. The likely cause of the problem has been identified, but there are further investigations that could be done, and the other toner cartridge probably has to be returned to the place it came from, i.e., the problem is not solved. This is generally true for steps that replace a printer component with another—if they succeed, the scope of the troubleshooting has been significantly narrowed down, but there are still remaining steps that can be performed to solve the problem completely.

Step F in Table 5 suggests performing the printer maintenance (PM) kit which must be performed every time a specific amount of pages has been printed. If the PM kit must be performed, the control panel of the printer will usually give a notification, but not necessarily always. It is a good idea to ask whether it is suggested on the control panel, before suggesting the PM kit, as the PM kit should only be performed if absolutely necessary.

Step T in Table 5 is a large and complicated troubleshooting step consisting of a series of substeps attempting to determine whether the print job is corrupted somewhere in the dataflow, and identifying the source of the corruption. Basically, the entire dataflow model for corrupt output described below fits under step T and its associated cause.

In a step 904, causes and troubleshooting steps are matched. The troubleshooting steps are matched with the causes that they can solve. Additionally, the causes that are associated with questions are identified. In this step, the causes are matched with troubleshooting steps such that actions are matched with the causes that they can solve, and questions are matched with the causes that they are associated with (i.e., affect the probabilities of).

For each action, $A_i$, it is considered for each cause, $C_j$, whether there is a non-zero probability that performing $A_i$ will solve $C_j$. If this is so, there is a match which is registered for later use in the knowledge acquisition process.

Information-gathering actions can be handled almost similarly to solution actions. Even though they are not able to solve the problem, they are still able to temporarily remove the problem while trying some change in the environment. For instance, in step B within Table 5 above, "Try another toner cartridge" will cause the problem to go away, if the cause is subcause 4a, 4b or 4c, as listed in Table 4 above. So, for information-gathering actions the causes for which the action will remove the problem when performed are still registered.

For each question, $Q_i$, it is considered for each cause, $C_j$, whether an answer to $Q_i$ will directly affect the belief in $C_j$ (i.e., cause the probability to decrease or increase).

Questions do not have to affect the beliefs of any causes at all as they are sometimes used to provide information about the troubleshooting scenario, user type, etc. to allow/disallow related actions. An example of this could be a question about the type or manufacturer of certain components, the answer to which controls whether the component supports certain actions. Thus, the probability of these actions succeeding is zero when the manufacturer of the component is not of the right type.

For the "light print" problem, the matching of steps and causes is as shown in Table 6 below. After each action or question, the associated causes (keyed to Table 4 above) are listed:

TABLE 6

| | Troubleshooting Steps | Causes |
|---|---|---|
| A) | Ensure that media is within specifications (SA) | 1 |
| B) | Try another toner cartridge that is within specification (IA) | 4 |
| C) | Remove, shake and reinsert toner cartridge (SA) | 4b, 4c |
| D) | Reseat transfer roller (SA) | 5b, 11a |
| E) | Try different media (IA) | 1 |
| F) | Perform printer maintenance kit (SA) | 2, 5, 11a |
| G) | Power cycle the printer (SA) | 11a |
| H) | Ensure that environmental conditions are within specifications (SA) | 3 |
| I) | Clean the inside of the printer according to the user manual (SA) | 2, 4b, 11a |
| J) | Try another in-spec transfer roller (IA) | 5, 11a |
| K) | Ensure economode/draft more is not on in the application (SA) | 6a |
| L) | Ensure 300 dpi is not set in the application (SA) | 6b |
| M) | Examine and correct other application settings related to "light print" (SA) | 6c |
| N) | Ensure economode is not on in the printer driver (SA) | 7a |
| O) | Ensure 300 dpi is not set in the printer driver (SA) | 7b |
| P) | Examine and correct other printer driver settings related to "light print" (SA) | 7c |
| Q) | Ensure economode/draft more is not on on the control panel of the printer (SA) | 8a |
| R) | Ensure 300 dpi is not set on the control panel of the printer (SA) | 8b |
| S) | Ensure print density is not set too low on the control panel (SA) | 8d |
| T) | Troubleshoot the dataflow (SA) | 9 |
| U) | Ensure that an in-spec up-to-date printer driver is used (SA) | 13 |
| V) | Is the printer maintenance kit due? (Q) | 2, 5, 5c |
| W) | Is the toner cartridge from a supported manufacturer? (Q) | 4 |
| X) | Does the control panel say "Toner low"? (Q) | 4, 4c |
| Y) | Is the printer configuration page printed light? (Q) | 1–5, 8, 11 |

In Table 6, troubleshooting step V affects the beliefs of causes 2, 5 and 5c, according to the domain experts. If the PM kit is due, there is a higher belief on some of the causes that are targeted by the PM kit, i.e., (2) dirty paper path, (5) transfer roller problems in general, and (5c) worn out transfer roller specifically.

The question in troubleshooting step Y requests information about a symptom—whether the configuration page is printed light. This is a symptom of causes 1–5, 8 and 11. These causes are the hardware causes that are still in effect when the configuration page is printed. The non-specified causes are software causes that have no effect in this situation. The acquisition of probabilities for questions is further describe below.

In a step 905 a check is made to see if any new causes or subcauses have been identified. These may be identified, for example, when matching the causes and steps. If there are any new causes or subcauses identified, a return is made to step 901.

When matching the actions and questions with the causes that they are associated with, it often happens that causes are discovered for which there are no solution actions, and actions are discovered that cannot solve any causes, i.e., there are respectively actions and causes missing. When this occurs, it is necessary to go back to step 901.

In a step 906, a check is made to see if any new troubleshooting steps have been identified, for example, when matching the causes and steps. If there are new troubleshooting steps that have been ident_ied, a jump is made back to step 903.

Causes and steps are often forgotten in the initial listing, and new causes and steps are often discovered when matching causes with steps. Therefore, it is optimal to perform the matching of causes and steps before eliciting the probabilities for causes, as this elicitation has to be performed partly over again each time a new cause is discovered.

In a step 907, probabilities of causes and subcauses are estimated. When there is a high degree of certainty that all causes have been listed, and causes and subcauses have been structured in a hierarchy, the probabilities of causes should be estimated. This is usually done bottom-up, so that the probabilities of subcauses given the cause are estimated first, and then the probabilities of causes given the problem.

The probabilities of subcauses are estimated first. The sets of subcauses are visited in sequence, such that a separate elicitation of probabilities is performed for each set of subcauses of the same cause. The probabilities of the subcauses are elicited assuming that the problem is present (e.g., "light print") and the cause is present (e.g., "toner cartridge problems"). When all probabilities of subcauses have been elicited, the probabilities of the causes are elicited, assuming that the problem is present.

Experience has shown that this method of probability elicitation where the probabilities are basically elicited against the causal direction (the subcauses cause the causes, and the causes cause the problem) is highly efficient as it provides the domain experts with maximum information to base their probabilities on as they are allowed to assume that the problem and/or the cause is present.

The usual procedure of eliciting the probabilities of a set of causes/subcauses is for one domain expert to give initial probabilities to most of the causes given the higher level cause—or at least a ranking (this is the highest, this is the next highest, etc.). Then the domain experts discuss the initial probabilities or rankings and adjust as a result of discussions. When final agreement is reached, the elicitation is closed.

The differences in belief that occur in the elicitation process are almost always due to a lack of knowledge by one of the domain experts, and it then takes a discussion to discover which of the domain experts are wrong. Most of the time agreement is reached quickly, and probabilities are adjusted to reflect this. However, occasionally it is necessary to confer with other experts to settle the disagreement.

When the disagreement in probabilities is very small (e.g., 0.05), a lengthy discussion is often deemed unnecessary and the average is chosen. However, when the disagreement is large, it is very important to reach a common understanding of the underlying domain structure, as this understanding may also help in future probability elicitations.

During the process of elicitation, a set of probabilities are developed for the causes under consideration. This set of probabilities does not necessarily have to be normalized (sum to 1.0) all the time. There is no reason not to be flexible and allow that the sum differs slightly from 1.0, as it would slow the process considerably if a sum of 1.0 has to be maintained at all times. When the elicitation is finished, it is easy to normalize the probabilities.

In one project, the domain experts preferred to elicit percentages instead of probabilities, such that 10.0% was used instead of 0.1, etc. This makes sense, as it is easier to work with numbers in the range 0–100 than in the range 0–1, as there are fewer decimals. Also, it is likely that they were used to thinking in percentages.

Obviously, there is always some amount of second-order uncertainty on the elicited probabilities. One standard method of representing this second-order uncertainty is to use probability intervals such that the domain expert states his/her belief that the probability is within a certain interval. When the domain experts have then agreed on a specific interval, there are methods that allows propagation of probability intervals in Bayesian networks. Rendering the second-order uncertainty explicit allows the domain expert to specify different size probability intervals for different probabilities, and the automated troubleshooter would be able to give its conclusions with the appropriate uncertainty.

For the problem of "light print", the following probabilities (in percentages) were elicited as set out in Table 7 below:

TABLE 7

| | | | |
|---|---|---|---|
| 1) | Media | 12 | |
| 2) | Paper path dirty | 22 | |
| 3) | Environmental conditions | 6 | |
| 4) | Toner cartridge problems | 35 | |
| | a) Defective toner cartridge | | 10 |
| | b) Improperly seated toner cartridge | | 5 |
| | c) Toner distribution | | 85 |
| 5) | Transfer roller problems | 20 | |
| | a) Defective or dirty transfer roller | | 25 |
| | b) Improperly seated transfer roller | | 65 |
| | c) Worn out transfer roller | | 10 |
| 6) | Incorrect application settings | 45 | |
| | a) Economode/draft mode on | | 75 |
| | b) 300/600 dpi set to 300 dpi | | 15 |
| | c) Other settings set wrong | | 10 |
| 7) | Incorrect printer driver settings | 27 | |
| | a) Econoniode set on | | 80 |
| | b) 300/600 dpi set to 300 dpi | | 15 |
| | c) Other settings set wrong | | 5 |
| 8) | Incorrect control panel settings | 2 | |
| | a) Economode/draft mode set on | | 85 |
| | b) 300/600 dpi set to 300 dpi | | 5 |
| | c) Print density set too low | | 10 |
| 9) | Corrupt data flow | 1 | |
| 10) | Wrong driver used | 15 | |
| 11) | Other problems | 10 | |
| | a) Temporary problem | | 10 |
| | b) Permanent problem | | 90 |

In step 908, probabilities of actions and questions are estimated.

In the preferred embodiment, there are two types of questions, those that pertain to symptoms or effects of causes, and general questions that are not naturally seen as a symptom or an effect. The knowledge acquisition processes for the two types of questions are different, so it is important to determine the type of the question before eliciting the probabilities for it. The difference between these two types of questions is further elaborated below.

For general questions, the causes associated with the question, have been previously listed, i.e., the causes that will have their probabilities decreased or increased depending on the answer to the question. For this type of questions, the domain experts consider each answer to the question (e.g., yes, no, etc.) and estimate how much the probabilities of the affected causes will decrease or increase based on the new information. The elicitation proceeds much like the one for causes—there can be disagreements in understanding that have to be solved by discussions.

The domain experts focus on the causes that are affected by the answer to the question, thus the probabilities of causes that are not affected, are not modified by the experts. However, the fact that other causes are having their probabilities increased or decreased will cause the probabilities of the remaining to change accordingly, such that the sum is still 1.0. It is clearly easier for the experts to only adjust the probabilities that are directly affected, and then let the rest change accordingly, than having the experts assess the changes in all probabilities. Also, it was the experience that the experts were comfortable with letting the remaining probabilities change accordingly.

In the "light print" problem, the probabilities (in percentages) were adjusted as set out in Table 8 below, given the answer to the question "do you see toner low on the control panel?":

TABLE 8

|  |  | Yes | No |
|---|---|---|---|
| 1) Media 12 |  |  |  |
| 2) Paper path dirty | 22 |  |  |
| 3) Environmental conditions | 6 |  |  |
| 4) Toner cartridge problems | 35 |  | −>90 |
|    a) Defective toner cartridge |  | 10 |  |
|    b) Improperly seated toner cartridge |  | 5 |  |
|    c) Toner distribution |  | 85 | −>25 |
| 5) Transfer roller problems | 20 |  |  |
|    a) Defective or dirty transfer roller |  | 25 |  |
|    b) Improperly seated transfer roller |  | 65 |  |
|    c) Worn out transfer roller |  | 10 |  |
| 6) Incorrect application settings | 45 |  |  |
|    a) Economode/draft mode on |  | 75 |  |
|    b) 300/600 dpi set to 300 dpi |  | 15 |  |
|    c) Other settings set wrong |  | 10 |  |
| 7) Incorrect printer driver settings | 27 |  |  |
|    a) Economode set on |  | 80 |  |
|    b) 300/600 dpi set to 300 dpi |  | 15 |  |
|    c) Other settings set wrong |  | 5 |  |
| 8) Incorrect control panel settings | 2 |  |  |
|    a) Economode/draft mode set on |  | 85 |  |
|    b) 300/600 dpi set to 300 dpi |  | 5 |  |
|    c) Print density set too low |  | 10 |  |
| 9) Corrupt data flow | 1 |  |  |
| 10) Wrong driver used | 15 |  |  |
| 11) Other problems | 10 |  |  |
|    a) Temporary problem |  | 10 |  |
|    b) Permanent problem |  | 90 |  |

Thus, the probability of "toner cartridge problems" being the cause of the problem is raised to 0.9 when it is known that the control panel of the printer says toner low. As the probability of the subcause "toner distribution" is already high compared with the other subcauses of "toner cartridge problems", it was decided not to increase this probability further.

Similarly, knowing that the control panel does not say toner low, it was decided to decrease the probability of the subcause "toner distribution" from 0.85 to 0.25. However, it was decided to leave the overall probability of "toner cartridge problems" at 0.35, even if it is known that the control panel does not say toner low.

Also, for general questions the domain experts have to give prior probabilities for the answers to the question. It will be explained below how to check whether the experts have specified inconsistent information for general questions by analysing the unconditioned probability of the associated causes, P(C), the conditional probability, P(C|Q), and the priors on the question P(Q), i.e., by comparing $\Sigma_Q P(C|Q)P(Q)$ with P(C).

For questions about symptoms, the causes that are associated with the question are listed in step 904, shown in FIG. 4 and described above, that is, the causes that cause the symptom in question. Here, the elicitation consists of giving for each of the associated causes, the probability of the symptom given the cause. Also, the probability that the symptom appears if none of the specified causes are present should be estimated.

In the problem of "light print" (question Y in Table 5) "is the configuration page printed light?" is a symptom question. The probabilities (in percentages) were assessed as in Table 9 below:

TABLE 9

|  |  | Yes |
|---|---|---|
| 1) Media |  | 100 |
| 2) Paper path dirty |  | 100 |
| 3) Environmental conditions |  | 100 |
| 4) Toner cartridge problems |  | 100 |
|    a) Defective toner cartridge |  |  |
|    b) Improperly seated toner cartridge |  |  |
|    c) Toner distribution |  |  |
| 5) Transfer roller problems |  | 100 |
|    a) Defective or dirty transfer roller |  |  |
|    b) Improperly seated transfer roller |  |  |
|    c) Worn out transfer roller |  |  |
| 6) Incorrect application settings |  |  |
|    a) Economode/draft mode on |  |  |
|    b) 300/600 dpi set to 300 dpi |  |  |
|    c) Other settings set wrong |  |  |
| 7) Incorrect printer driver settings |  |  |
|    a) Economode set on |  |  |
|    b) 300/600 dpi set to 300 dpi |  |  |
|    c) Other settings set wrong |  |  |
| 8) Incorrect control panel settings |  | 100 |
|    a) Economode/draft mode set on |  |  |
|    b) 300/600 dpi set to 300 dpi |  |  |
|    c) Print density set too low |  |  |
| 9) Corrupt data flow |  |  |
| 10) Wrong driver used |  |  |
| 11) Other problems |  | 50 |
|    a) Temporary problem |  |  |
|    b) Permanent problem |  |  |

The probability (as percentage) of symptom if none of the specified causes are present is 1.

Thus, the domain experts assessed that, e.g., if the cause is an incorrect control panel setting (cause 8 in Table 9 above), then there is a probability of 1.0 (100%) that the configuration page will be printed light, and similarly if the cause is either the media, the paper path, the environmental conditions, etc.

If the cause is "other problems", the experts assessed that with a probability of 0.5 the configuration page would be printed light. The reason this probability is not 1.0 is that some temporary and permanent problems will not have an effect on the printing of the configuration page.

The domain experts did not want to completely rule out the possibility that the configuration page could be printed light, even if none of the above specified causes were present, so they left a 0.01 probability for this situation.

Figure 7:
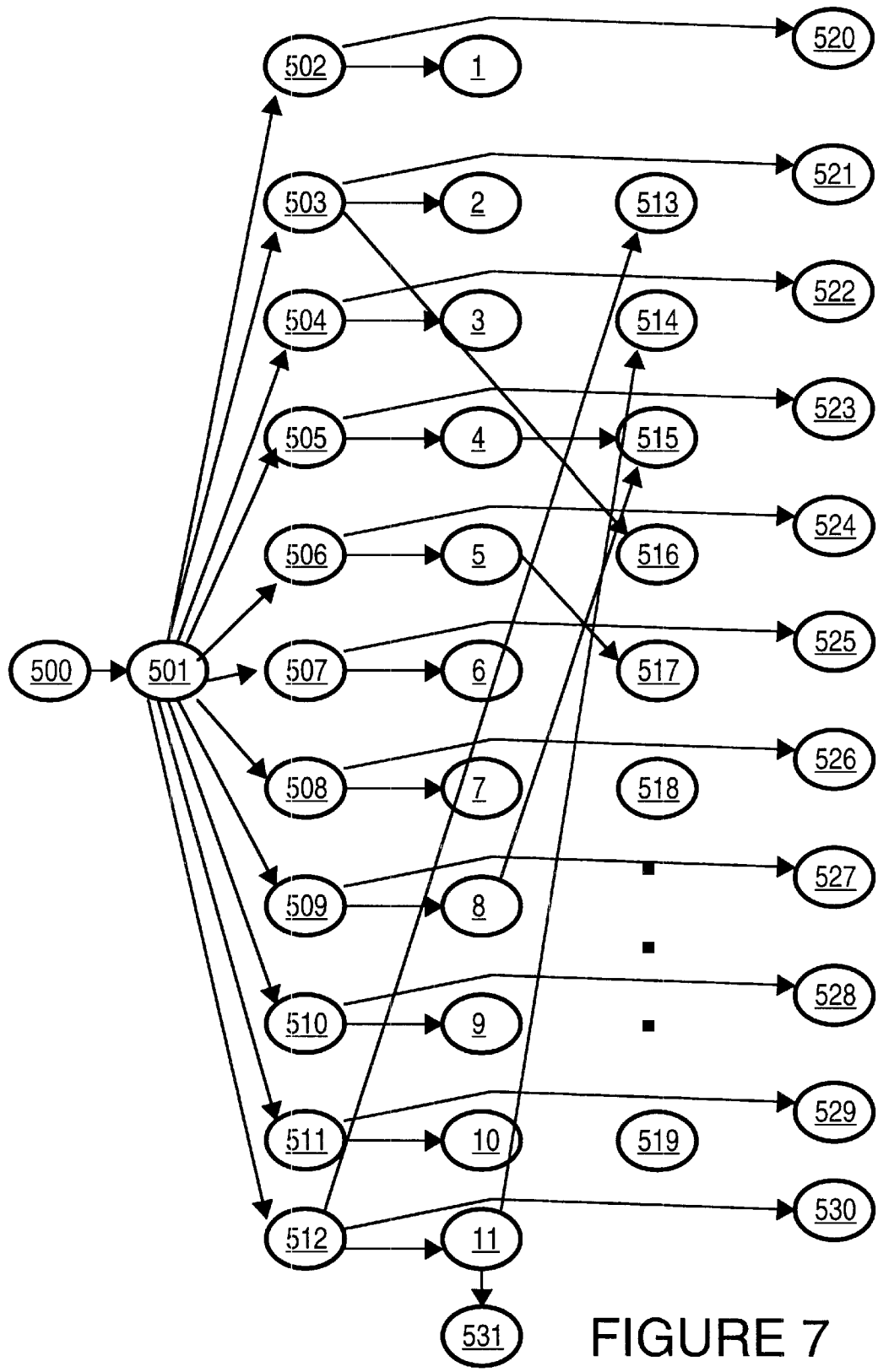
FIG. 7 shows a more detailed overview of a Bayesian network for the dataflow model shown in FIG. 6 in accordance with a preferred embodiment of the present invention.

In the dataflow model shown in FIG. 7, there is a second category of questions: global questions. Global questions can, as questions in general, be both information-gathering or standard questions. They are termed global because they operate on a higher level than ordinary questions, as they are used to determine which of the components in the dataflow has caused the problem. The knowledge acquisition for global questions can be done similar to regular questions, with causes replaced by components.

For actions, it is necessary to determine the probability that the action solves the problem given each of the causes listed in step 904 of FIG. 4. These causes are assumed to be the causes that the action can potentially solve.

The troubleshooting algorithms needs the probability of the actions solving the problem given previously obtained information about the problem—so the domain experts have to answer for each listed cause, $C_i$, assuming that $C_i$ is the only cause of the problem in question, what is the probability that performing the action solves the problem?

Experience shows that too many things have to be taken into account when estimating this probability, i.e., both the actual probability that the action solves the problem if it is performed correctly, but also the probability that the action is performed correctly. If too many things have to be taken into account and considered simultaneously, the result is probabilities of a low quality.

The estimates will be of higher quality if the above elicitation is split into two probability elicitation questions. The first probability elicitation question is, assuming that $C_i$ is the only cause of the problem in question, what is the probability that correctly performing the action solves the problem? The second probability elicitation question is, assuming that $C_i$ is the only cause of the problem in question, what is the probability that the user performs the action incorrectly without realizing it?

When answering the first probability elicitation question, the domain experts can assume that the action is performed correctly, and it is thus easier to assess the probability that it solves the problem. When answering the second probability elicitation question, the domain experts can concentrate on assessing the probability that the user performs the action incorrectly.

It is important to assess the probability that the user performs the action incorrectly without realizing it, and not the overall probability of performing the action incorrectly. This probability is needed to represent the possibility of incorrect feedback from the user. Incorrect feedback will be gotten in the situation where the user does not realize that he did the action incorrectly. So, the case where the user does realize that he did the action incorrectly is not included in the probability the situations. In these situations, the user will not input incorrect feedback, but is likely to try performing the action again, or give as input that he was unable to perform the action.

If the probability found when answering the first probability elicitation question is denoted $P_1$, and the probability found when answering the second probability elicitation question is denoted $P_2$, the overall probability of the action solving the problem given cause $C_i$ is then found as:

$$P(A=yes|C_i=yes)=P_1(1-P_2)$$

Experience has shown that there is little variability in the probability assessed when answering the second probability elicitation question, also termed the inaccuracy of the user's response. Thus, it was sufficient to estimate a factor between 0 and 4 for the inaccuracy using the range: 0—very low, 1—low, 2—medium, 3—high, 4—very high. This inaccuracy factor can then be converted to a probability as in Table 10 below:

TABLE 10

| | |
|---|---|
| VL | 0 |
| L | 2% |
| M | 5% |
| H | 10% |
| VH | 20% |

The conversion of inaccuracy factors to probabilities can be determined by a series of questions to the domain experts.

There are a few further assumptions that have to be made when assessing the action probabilities -

If there are certain requisites necessary to perform an action, it is always assumed that they are available when the action is suggested. Thus, it is not necessary to take the availability of requisites into account when assessing the probability that an action will solve the problem. The availability of requisites is handled by allowing the user to skip an action by reporting that he is not able to or does not want to perform it.

When an action involves replacing a suspected component with another, there is a slight chance that the new component is faulty and causes the same problem. Even though this probability is often negligible, it is necessary to take it into account when assessing the probability that an action solves the problem. If the replacement component is faulty and causes the same problem, the user will input to the troubleshooting system that the action didn't help. The system should then not rule out completely the causes that the action can solve, as the replacement component could have been faulty.

As discussed above, there is a distinction made between solution actions and information-gathering actions. Even though information-gathering actions cannot solve the problem, the probabilities are gathered in almost exactly the same way. In practice, even though information-gathering actions cannot solve the problem, they conduct an experiment on the system to see whether the problem goes away when the configuration is changed.

The first probability elicitation question above should then be asked slightly differently: assuming that $C_i$ is the only cause of the problem in question, what is the probability that correctly performing the action makes the problem go away in the new configuration?

For the "light print" problem, the probabilities of actions look as is set out in Table 11 below. After each action, the associated causes and the probability that the action will solve them are listed. The inaccuracy factors are discussed later.

TABLE 11

| | Action | Cause:Probability |
|---|---|---|
| A) | Ensure that media is within specifications (SA) | 1:100 |
| B) | Try another toner cartridge that is within specification (IA) | 4:100 |
| C) | Remove, shake and reinsert toner cartridge (SA) | 4b:100, 4c:60 |
| D) | Reseat transfer roller (SA) | 5b:100, 11a:100 |
| E) | Try different media (IA) | 1:90 |
| F) | Perform printer maintenance kit (SA) | 2:100,5:100,11a:100 |
| G) | Power cycle the printer (SA) | 11a:100 |
| H) | Ensure that environmental conditions are within specifications (SA) | 3:100 |
| I) | Clean the inside of the printer according to the user manual (SA) | 2:100,4b:100,11a:100 |
| J) | Try another in-spec transfer roller (IA) | 5:100, 11a:100 |
| K) | Ensure economode/draft mode is not on in the application (SA) | 6a:100 |
| L) | Ensure 300 dpi is not set in the application (SA) | 6b:100 |
| M) | Examine and correct other application settings related to "light print" (SA) | 6c:100 |
| N) | Ensure economode is not on in the printer driver (SA) | 7a:100 |
| O) | Ensure 300 dpi is not set in the printer driver (SA) | 7b:100 |
| P) | Examine and correct other printer driver settings related to "light print" (SA) | 7c:100 |
| Q) | Ensure economode/draft more is not on on the control panel of the printer (SA) | 8a:100 |
| R) | Ensure 300 dpi is not set on the control panel of the printer (SA) | 8b:100 |
| S) | Ensure print density is not set too low on the control panel (SA) | 8d:100 |
| T) | Troubleshoot the dataflow (SA) | 9:100 |
| U) | Ensure that an in-spec up-to-date printer driver is used (SA) | 13:100 |

In a step 909, costs of actions and questions are estimated.

In the troubleshooting algorithms, it is necessary to know the cost of performing actions and questions to be able to determine which is the optimal step to perform next. The cost can either be estimated as a single factor, or as a combination of multiple factors. As the cost really is composed of multiple significant factors, it seems to be the most reliable and accurate approach to assess each of these factors separately, and then combine the factors into a single cost factor. The cost is composed of many factors. Four which seem to be the most significant are described below.

The first factor is time: the time (in minutes) it takes to perform a step. Time that is spent in labor is distinguished from time that is spent waiting, weighing waiting time lower than labor time, implying that a step that takes 10 minutes of mostly waiting is given a lower cost than a step that takes 10 minutes in constant labor. When estimating the time, it is averaged over the user population. There are experienced users that can perform certain steps faster than others, but the final time-estimate will have to be averaged over all types of users.

The second factor is risk: the risk (very low, low, medium, high or very high) of breaking or destroying something else when performing the step. The risk is very relevant when suggesting steps as it is desirable to suggest the steps with the lowest risk of breaking something before steps with higher risk. Again, the risk must be averaged over the user population where there are both experienced users with low risk of breaking something, and novice users with higher risk.

The third factor is money: the amount of money (very low, low, medium, high or very high) required to purchase the requisites of a step. There are steps where there is a high likelihood that users do not have all the required requisites and may have to purchase them—and these steps should receive a higher cost than similar steps with no requisites. Again, the amount of money required for a step must be averaged over the user population. Depending on the user type, some users may have the necessary requisites, while others may have to purchase them.

The fourth factor is insult: the degree of insult the user experiences when the step is suggested (very low, low, medium, high or very high). If an experienced user is suggested a novice step (e.g., check whether the printer is plugged in), he may feel insulted. Therefore, such a step is given a slightly higher cost to allow less insulting steps to be suggested earlier in the sequence.

There are several other factors of cost that can be considered such as the inconvenience in performing a step, however, experience has proven a real need only for the above four. The inconvenience of a step is taken into account partly by the time and risk (if it is inconvenient, it is likely to take a longer time and be more risky), but also by the ability to skip a step.

The cost factors must be combined into a single figure to be useful for the troubleshooting algorithms. To do this, the risk, money and insult factors must be converted to numbers, and finally the four factors must be balanced and added. To determine how to do this, many experiments must be performed with the domain experts asking them to rank steps which differ on cost factors. From a sufficient amount of such experiments, the conversion factors and weights can be determined. One such experiment could for instance be:

Of two actions with equal probability of solving the problem, which do you want to suggest first?

$A_1$ with time=20, risk=medium $A_2$ with time=10, risk=high

For the printing system domain, the conversion of the risk factor to a number comparable with time is as set out in Table 12 below:

TABLE 12

| | |
|---|---|
| very low | 0 |
| low | 1 |
| medium | 2 |
| high | 4 |
| very high | 8 |

The resulting number is multiplied with 9, i.e., a 0 minute step with very high risk is equal to a 72 (8×9) minute step with very low risk.

The conversion of the money factor to a number comparable with time is as set out in Table 13 below:

TABLE 13

| | |
|---|---|
| very low | 0 |
| low | 1 |
| medium | 3 |
| high | 10 |
| very high | 30 |

The resulting number in Table 13 is multiplied with 10, i.e., a 0 minute step with a money factor of very high is equal to a 300 (30×10) minute step with a money factor of very low.

The insult factor was only used in rare occasions in the printing system project, thus a full conversion was not defined. When an insult factor of low was specified, this was converted to 10.

For the "light print" problem, the inaccuracy and cost factors are as set out in Table 14 below (in the order, inaccuracy, time, risk, money and insult):

TABLE 14

| | Troubleshooting Steps | I | T | R | M | I |
|---|---|---|---|---|---|---|
| A) | Ensure that media is within specifications (SA) | VH | 15 | 0 | 0 | 0 |
| B) | Try another toner cartridge that is within specification (IA) | L | 7 | L | 0 | 0 |
| C) | Remove, shake and reinsert toner cartridge (SA) | 0 | 2 | 0 | 0 | 0 |
| D) | Reseat transfer roller (SA) | M | 4 | L | 0 | 0 |
| E) | Try different media (IA) | L | 8 | 0 | 0 | 0 |
| F) | Perform printer maintenance kit (SA) | M | 25 | H | 0 | 0 |
| G) | Power cycle the printer (SA) | 0 | 1 | 0 | 0 | 0 |
| H) | Ensure that environmental conditions are within specifications (SA) | VH | 120 | 0 | 0 | 0 |
| I) | Clean the inside of the printer according to the user manual (SA) | L | 7 | L | 0 | 0 |
| J) | Try another in-spec transfer roller (IA) | L | 10 | M | 0 | 0 |
| K) | Ensure economode/draft more is not on in the application (SA) | L | 2 | 0 | 0 | 0 |
| L) | Ensure 300 dpi is not set in the application (SA) | L | 2 | 0 | 0 | 0 |
| M) | Examine and correct other application settings related to "light print" (SA) | L | 5 | 0 | 0 | 0 |
| N) | Ensure economode is not on in the printer driver (SA) | 0 | 1 | 0 | 0 | 0 |
| O) | Ensure 300 dpi is not set in the printer driver (SA) | 0 | 1 | 0 | 0 | 0 |
| P) | Examine and correct other printer driver settings related to "light print" (SA) | L | 5 | 0 | 0 | 0 |
| Q) | Ensure economode/draft more is not on on the control panel of the printer (SA) | L | 2 | 0 | 0 | 0 |
| R) | Ensure 300 dpi is not set on the control panel of the printer (SA) | L | 2 | 0 | 0 | 0 |
| S) | Ensure print density is not set too low on the control panel (SA) | L | 2 | 0 | 0 | 0 |

TABLE 14-continued

| | Troubleshooting Steps | I | T | R | M | I |
|---|---|---|---|---|---|---|
| T) | Troubleshoot the dataflow (SA) | VH | 75 | VH | 0 | 0 |
| U) | Ensure that an in-spec up-to-date printer driver is used (SA) | L | 15 | L | 0 | 0 |
| V) | Is the printer maintenance kit due? (Q) | 0 | 1 | 0 | 0 | 0 |
| W) | Is the toner cartridge from a supported manufacturer? (Q) | 0 | 1 | 0 | 0 | 0 |
| X) | Does the control panel say "Toner low"? (Q) | 0 | 1 | 0 | 0 | 0 |
| Y) | Is the printer configuration page printed light? (Q) | 0 | 4 | 0 | 0 | 0 |

In a step 910, actions and questions requiring special handling are identified and dealt with.

There are several pieces of additional information that it is necessary to specify for the troubleshooting model to get a troubleshooter that performs as desired. These are collectively referred to as actions and questions requiring special handling.

One of these is initial steps. For some problems, there are default causes that should be ruled out initially, as it is insulting for the customer to start investigating these at a later point. For instance, with the errorcode "tray 2 lifting", it is possible that the user simply didn't wait a sufficient amount of time for the tray to lift, as it can take a while. It is therefore a benefit to ask first whether the user waited long enough, and if not, tell him to. There is no reason to include these steps in the ordinary selection of troubleshooting steps, as they should always be forced first. The domain experts should identify steps of this type, and mark them as such.

Another piece of information to specify is workarounds. Actions can be classified as workarounds which signify that they may solve the problem, but the solution may not be satisfactory, e.g., solving a problem with insufficient memory by printing smaller jobs. If an action is classified as a workaround, the user will be prompted whether he is satisfied with the solution, if the workaround helps.

Another piece of information to specify is replacing components. If an action replaces a component with another, it is important to register this, as then the automated troubleshooter will be able to handle situations where the component was improperly seated. If replacing a component with another works, it might have been because the component was improperly seated in the first place, so the troubleshooter should prompt the user to try re-inserting the old component once again to verify this.

Another piece of information to specify is irreversible actions. If an action solves the problem, but the cause has not been fully identified, the user is asked whether he wants to continue troubleshooting. If he agrees to continue, he will have to reverse the last action so that the problem reappears. If the last action performed is irreversible (e.g., reboot PC, power cycle printer), this is not possible. In that situation, the user should not be asked whether he wants to continue troubleshooting, as this is not possible. Therefore, the domain experts should register actions that are irreversible.

Another piece of information to specify is included actions. Actions may include other actions. For example, it is common that actions include power cycling the printer, so, if such an action has been performed it should not be later suggested to the user to power cycle the printer again. Therefore, the domain experts should register if an action includes other actions.

Another piece of information to specify is special-case steps. There are steps that should only be suggested in special cases, for example, after a specific question has been answered with a specific answer, or only if a specific question has not been answered with a specific answer. For instance, in the printing system domain there are special manufacturer-specific actions that should only be suggested when the manufacturer of a component has been verified.

Another piece of information to specify is persistence. Persistence refers to the problem of old observations being rendered invalid by later performed actions. There are often situations with a question Q and an action A, where Q requests the status of some property of the system, and if the status is not the desired one, action A will be suggested to fix this. Troubleshooting cannot be continued with the observation that Q is in the non-desired state. The state of Q is modified to ensure that the troubleshooter operates on valid information. This situation can be handled by having the domain experts register situations where there are question-action pairs Q and A, such that performing A fixes Q in a specific state. The troubleshooter then knows to automatically fix Q in this state, if A is performed, indifferent to what Q was previously observed as. Obviously this is still an approximate solution, as it is not integrated in the computation of expected cost of repair (ECR).

Figure 5:
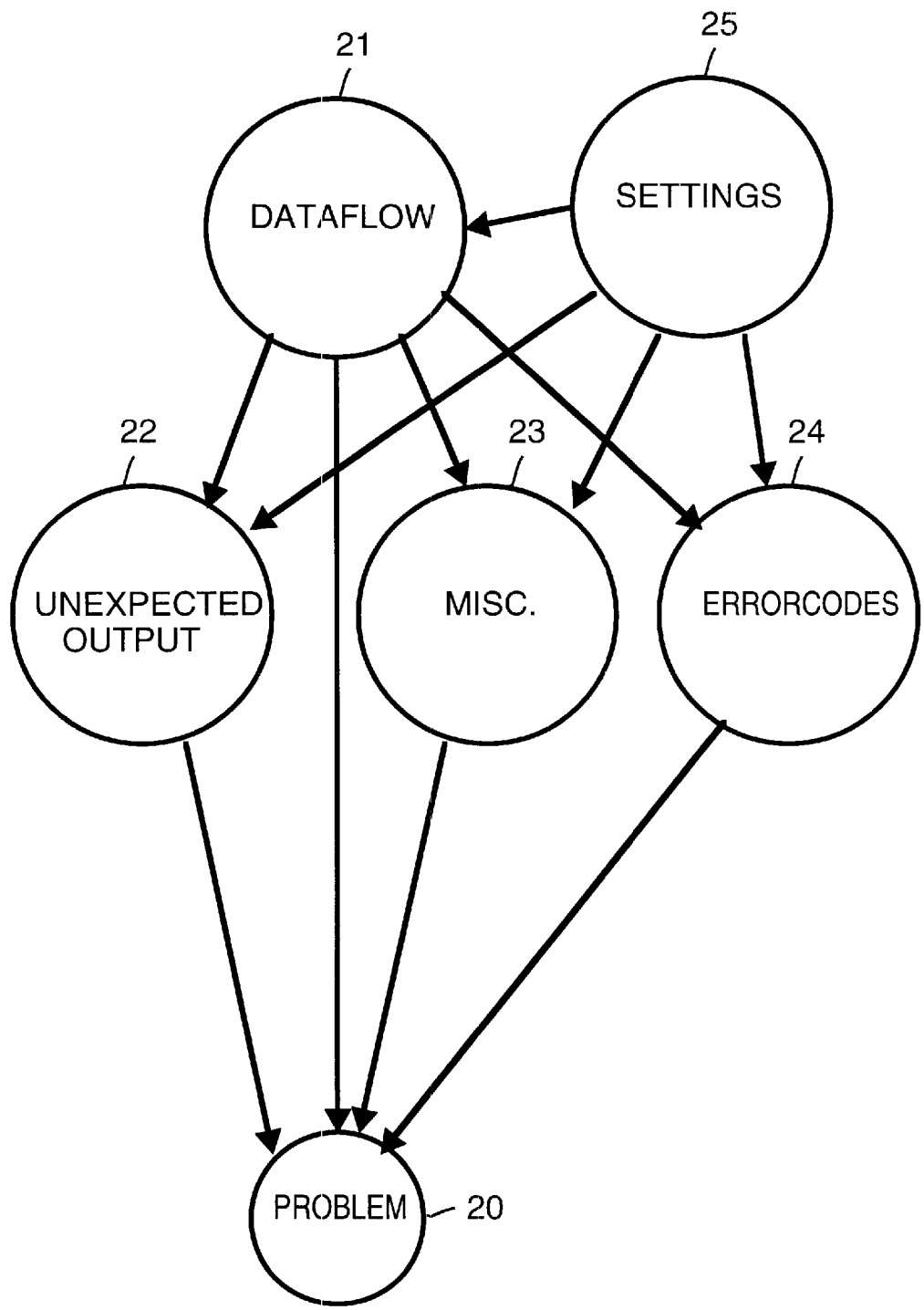
FIG. 5 shows a system for automated customer support operations (SACSO) printing diagnosis systems in accordance with a preferred embodiment of the present invention.

FIG. 5 shows a system for automated customer support operations (SACSO) printing diagnosis systems. The SACSO printing diagnosis system consists of several Bayesian networks modeling different types of printing errors. These networks and their interrelations are shown in FIG. 5. Each of the large circles represents one component of the total model.

A dataflow model 21 covers all errors where the customer does not get output from the printer when attempting to print, or where he gets corrupted output. These errors can be caused by any of the components in the flow from application to printer that handles the data, thus the term dataflow.

An unexpected output model 22 handles all categories of unexpected output that can occur on the printer, i.e., job not duplexed, spots/stripes/banding/etc. on the paper. For some types of unexpected output, the corrupt data caused by some component in the dataflow can be a cause, thus the dataflow component is a parent of this component.

An errorcodes model 24 handles all types of errorcodes that can be seen on the control panel of the printer. For some errorcodes, corrupt data can be a cause, thus the dataflow component is a parent of this component.

A miscellaneous model 23 handles miscellaneous erroneous behavior of the printer not covered by the above three, such as noises from the printer engine, slow printing, problems with bi-directional communication, etc.

Dataflow model 21, unexpected output model 22, errorcodes model 24 and miscellaneous model 23 are also referred to as the four error components of the SACSO printing diagnosis system.

A settings model 25 represents all the possible settings in the printing system, i.e., application, printer driver, network driver and control panel settings. Often, settings determine the behavior, thus this component is a parent of the four error component.

Each of the four error components in FIG. 5 has a variable that is a descendant of all other variables in the component, and basically a logical OR of all of them, such that if there is a problem with one of the subcomponents, then the root variables indicate that there is a problem with the component. Specifically, a problem variable 10 in FIG. 5 is a logical OR of its four parents (dataflow model 21, unexpected output model 22, errorcodes model 24 and miscellaneous model 23), thus it represents in general whether there is a problem in the printing system.

Figure 6:
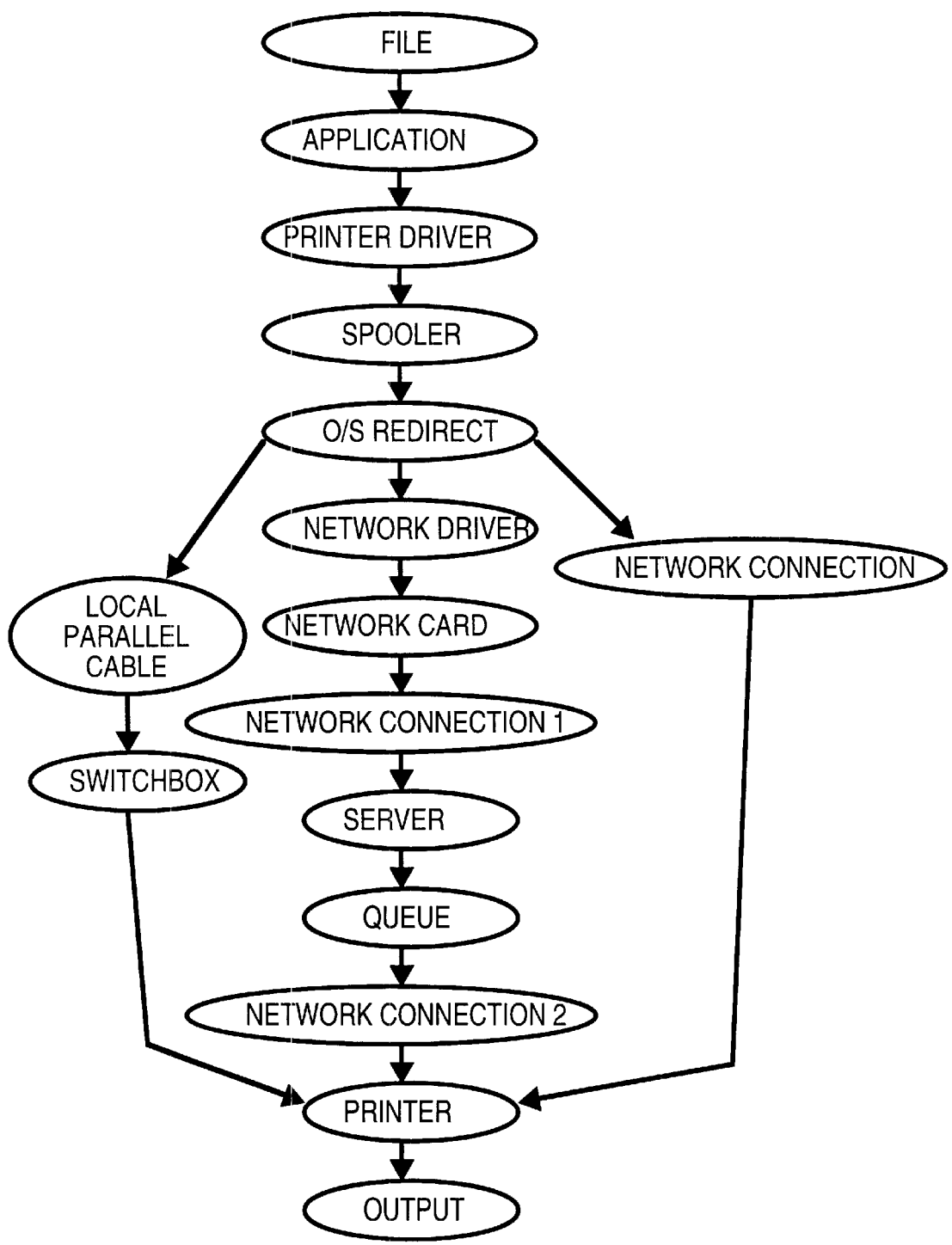
FIG. 6 shows the components of a data flow model in accordance with a preferred embodiment of the present invention.

FIG. 6 shows the components of data flow model 21. Each of the circles represent a Bayesian network model of how the component in question can cause corrupted or stopped/lost output. The dataflow can follow four different routes, as also depicted in FIG. 6, depending on the setup that the customer is using. For example, dataflow can be (1) directly to a printer that is connected with the local PC by a parallel cable, (2) over the network to a printer that is managed by a printer server, (3) over the network to a printer that is connected to a printer server with a parallel cable, or (4) directly over the network to the printer (e.g., by using JetDirect software available from Hewlett-Packard Company).

The printing system setup is a variable in dataflow model 21 that makes sure that only the relevant path in dataflow model 21 is being used. Each of the components in the dataflow receives the status of the data as input from the previous component in the flow, i.e., whether it is ok, corrupted or not present anymore (lost somewhere prior in the flow). The component consists of subcomponents that have a probability of causing the data to be corrupted or lost/stopped at this point in the flow.

FIG. 7 shows a more detailed overview of the Bayesian network for dataflow model 21. Dataflow model 21 includes a dataflow problem node 500, data flow components node 501, and nodes for component, data flow node, data flow, global troubleshooting steps and component networks. The component nodes include a file problem node 502, an application problem node 503, a printer driver problem node 504, a spoller problem node 505, an operating system (OS) redirect prolbem node 506, a network driver/card problem node 507, a server problem node 508, a queue problem node 509, a printer network cable problem node 510, a printer network card problem node 511 and a printer prolbem node 512. The data flow nodes include a flow node 1, a flow node 2, a flow node 3, a flow node 4, a flow node 5, a flow node 6, a flow node 7, a flow node 8, a flow node 9, a flow node 10, a flow node 11 and an output node 531. Flow node 1 is also referred to as flow 1. Flow node 2 is also referred to as flow 2. And so on.

Node 513, 514, 515, 516, 517, 518 and 519 represent global troubleshooting steps nodes. For example, node 513 represents the troubleshooting step "Does connecting the Printer locally work?" Node 514 represents the troubleshooting step "Do you see any reaction on the printer?" Node 515 represents the troubleshooting step "Does the print job go through the spooler?" Node 516 represents the troubleshooting step "Does pring the job with another application work?" Node 517 represents the troubleshooting step "Does printing to a parallel connected printer work?" Nodes 518 and 519 represent other global level troubleshotting steps. In addition, other troubleshooting steps may be represented by additional nodes.

FIG. 7 depicts one of the four scenarios modeled, the one where the user is printing to a network printer controlled by a network printer server. Problem-defining node 500 named "Dataflow problem" basically signifies whether there is a problem in the dataflow at all, i.e., it has two states yes and no. It is a parent to node 501 "Dataflow components" definining all the components of the dataflow. Node 501 has a state for each component, i.e., file, application, printer driver, spooler, ... , printer, and an extra state N/A for when there are no problems in the dataflow.

In FIG. 7, the arcs are directed from the problem (dataflow problem) towards the causes (the components) and the subcauses which is against the causal direction. However, the arcs can be reversed if necessary, for representing, e.g., persistence. This direction for the arcs is used herein because the specification of probabilities becomes easier.

The conditional probability distribution for "Dataflow components" 501 is as set out in Table 15 below:

TABLE 15

| "Dataflow components" 501 states | "Dataflow problem" 500 states | |
|---|---|---|
| | yes | no |
| File | $x_1$ | 0 |
| Application | $x_2$ | 0 |
| Printer driver | $x_3$ | 0 |
| Spooler | $x_4$ | 0 |
| ... | ... | 0 |
| Printer | $x_{11}$ | 0 |
| N/A | 0 | 1 |

All the x's in Table 15 represent probabilities; for each component the probability that it is the cause of the problem. From the knowledge acquisition process defined above, a probability distribution over the components in the dataflow is obtained which is then used directly in the above probability distribution.

For each component in the dataflow, component indicator nodes 502, 503, 504, 505, 506, 507, 508, 509, 510, 511 and 512 represent whether the problem is due to that component. Component indicator nodes 502 through 512 each have two states, yes and no. For example, component indicator node "File problem" 502 has conditional probability distribution as set out in Table 16 below:

TABLE 16

| "File problem" 502 states | "Dataflow components" 501 states | | | | |
|---|---|---|---|---|---|
| | File | Application | ... | Printer | N/A |
| yes | 1 | 0 | 0 | 0 | 0 |
| no | 0 | 1 | 1 | 1 | 1 |

All of the component indicator nodes are parents of the dataflow structure which is a series of nodes that represent the fact that if data is lost at some point x in the flow, it will also be lost at a later point y>x in the flow. As an example of this, consider the conditional probability distribution for "Flow 4", set out in Table 17 below:

TABLE 17

| "Spooler problem" states | | yes | | no | |
|---|---|---|---|---|---|
| "Flow 3" states | | ok | lost | ok | lost |
| "Flow 4" | ok | 0 | 0 | 1 | 0 |
| states | lost | 1 | 1 | 0 | 1 |

At the end of the flow there is an output node 531 representing whether the user gets any output. It is constructed similar to the other nodes in the flow.

In dataflow model 21 there are two levels of troubleshooting steps. The first level of troubleshooting steps are global troubleshooting steps that are used to determine which of the components are causing the problem. The first level of troubleshooting steps are local troubleshooting steps that are used on specific components to determine which of the causes of the component is the right one. The local troubleshooting steps are part of the component networks nodes The global troubleshooting steps 513, 514, 515, 516, 517, 518 and 519 are associated with some of the component nodes 502–512 and/or some of the nodes in the dataflow. For example, "Does connecting the printer locally solve the problem" 513 is associated with "Flow 5" and "Printer problem" 512. If the job does not get to "Flow 5" or the problem is due to the printer itself, it will not work to connect the printer locally. This is modeled with the following conditional probability distribution for node 513, as set out in Table 18 below:

TABLE 18

| "Flow 5" states "Printer problem" | | ok | | lost | |
|---|---|---|---|---|---|
| states | | yes | no | yes | no |
| 513 states | yes | 0 | 1-$\epsilon$ | 0 | 0 |
| | no | 1 | $\epsilon$ | 1 | 1 |

There is a probability ($\epsilon$) that the user is not able to correctly connect the printer locally and print, thus even if the printer is fully functioning and the job gets to "Flow 5", it is not absolutely certain that it is going to work. The probability $\epsilon$ is referred to as the inaccuracy of the action and it was described above in the discussion about knowledge acquisition. Similarly, the knowledge acquisition necessary for modeling global and local troubleshooting steps was described above.

The last column in FIG. 7 contains the component network nodes 520, 521, 522, 523, 524, 525, 526, 527, 528, 529 and 530. Each of the component network nodes 520–530 represents a Bayesian network modeling the causes of the component in question.

Figure 8:
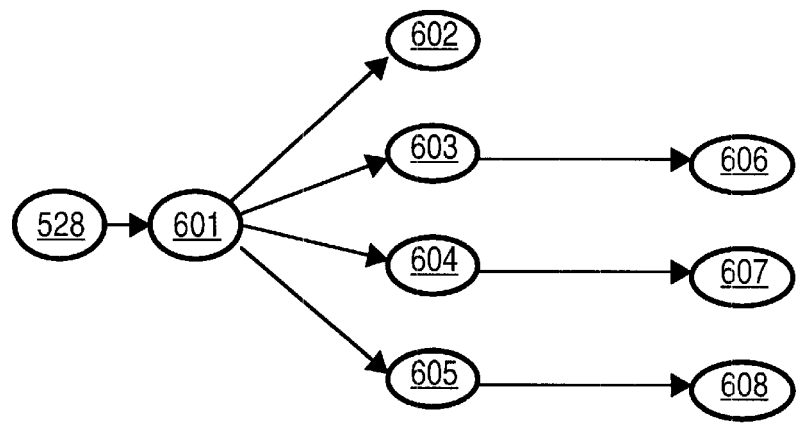
FIG. 8 shows two examples of component networks in accordance with a preferred embodiment of the present invention.
Figure 8:
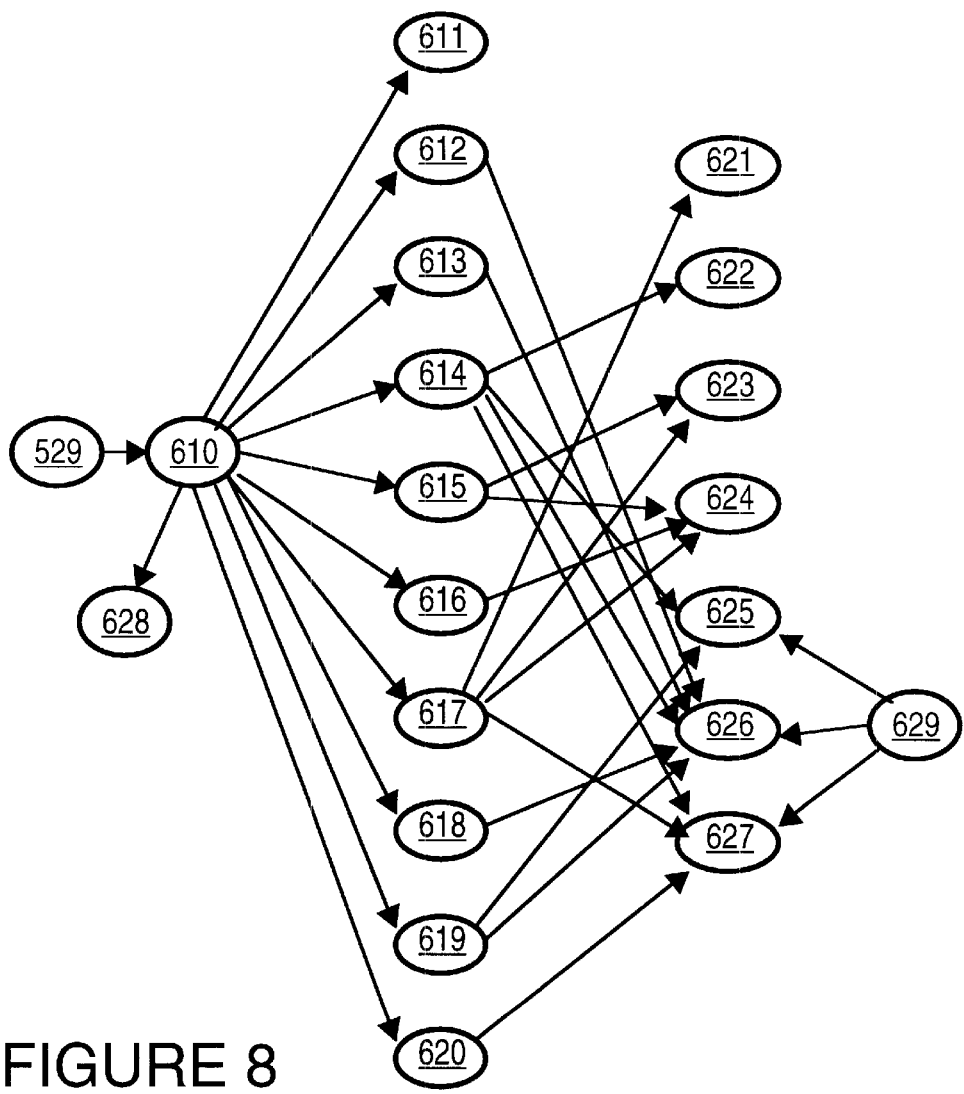

FIG. 8 shows two examples of component networks. In FIG. 7 these component networks appear as collapsed nodes. In FIG. 8 they are expanded to full size. Particularly, printer network (NW) cable component node 528 and printer NW card component node 529 are shown expanded in FIG. 8.

Indicator node 528 "Printer NW cable component" has two states, yes and no, indicating whether the printer network cable is the cause of the problem or not. It is the parent of "Printer NW cable causes" 601 which represents the probability distribution over the causes of the printer network cable, similar to node 501 in FIG. 7. The conditional probability table of node 601 is as is set out in Table 19 below:

TABLE 19

| "Printer NW cable causes" | "Printer NW cable component" 528 states | |
|---|---|---|
| 601 states | yes | no |
| Defective | $x_1$ | 0 |
| Not seated properly | $x_2$ | 0 |
| Out of specification | $x_3$ | 0 |
| In the wrong plug (printer or wall) | $x_4$ | 0 |
| N/A | 0 | 1 |

The x's in Table 19 specify the probability distribution over the causes for the printer network cable failure acquired from the domain experts.

Each of the nodes 602, 603, 604 and 605 represents causes of the printer network cable failure and has states yes and no. They have conditional probability distributions similar to node 502 above.

For example, node 602 represents a defective cable. Node 603 represents a cable that is not properly seated. Node 604 represents a cable that is out of specification. Node 605 represents a problem with the cable in the wrong plug at the printer or the wall. In FIG. 8 there are no subcauses present, but in many situations there exist subcauses of causes.

Nodes 606, 607 and 608 represent troubleshooting steps. For example, node 606 represents the troubleshooting step "Does reseating the NW cable solve it?". Node 607 represents the troubleshooting step "Does ensuring that the NW cable is in specification solve it?" Node 608 represents the troubleshooting step "Does ensuring that the NW cable is in correct plug solve it?".

Indicator node 529 "Printer NW card component" also has two states, yes and no, indicating whether the printer network card is the cause of the problem or not. It is the parent of "Printer NW card causes" 610 which represents the probability distribution over the causes of the printer network cable, similar to node 501 in FIG. 7.

Each of the nodes 611–620 represents causes of the printer network cable and has states yes and no. They have conditional probability distributions similar to node 502 above.

For example, node 611 represents defective card. Node 612 represents a network incompatibility. Node 613 represents an unsupported network card. Node 614 represents an incorrect network card setting. Node 615 represents the network card has not been properly installed. Node 616 represents other network problems. Node 617 represents the printer off. Node 618 represnts the firmware on the network card needs updating. Node 619 represents the firmware on the network card is corrupt. Node 620 represents that the NVRAM on the network card is corrupt.

Nodes 621–627 represent troubleshooting steps. For example, node 621 represents the troubleshooting step "Does ensuring the printer is turned on solve it?". Node 622 represents the troubleshooting step "Does ensuring that the NW card settings are correct solve it?" Node 623 represents the troubleshooting step "Does reseating the NW card solve it?" Node 624 represents the troubleshooting step "Does moving the NW card to another slot work?" Node 625 represents the troubleshooting step "Does reloading the firmware on NW card solve it?" Node 626 represents the troubleshooting step "Does updating the firmware on NW card solve it?" Node 627 represents the troubleshooting step "Does resetting the NW card to default and reconfiguring solve it?" Node 629 represents the question "IS the NW card manufactured by Hewlett-Packard Company?" Node 28 asks the question "is the NW card supported?"

Unexpected output model 22 (shown in FIG. 5) is composed of Bayesian network models for situations where the user gets an output from the printer that is different from the expected. There are many of these (job not duplexed, spots on paper, too light print, etc.) and each of them can be modeled with a Bayesian network similar to the components of the dataflow shown in FIG. 8.

Errorcode model 24 (shown in FIG. 5) is composed of Bayesian network models for situations where the user gets an errorcode on the front panel of the printer. These problems can also be modeled similar to the components of the dataflow, i.e., a problem defining node, a node defining the probabilities over causes, an indicator node for each cause representing whether the cause is present, nodes defining the probabilities over subcauses, a node for each subcause, a node for each action, and a node for each question.

Modeling of actions and questions will now be described in greater detail. Actions are associated with a number of causes that they have a probability of solving. If an action A can solve causes, $C_1, \ldots, C_k$, k probabilities must be specified, $p(A=yes|C_1=yes), \ldots, p(A=yes|C_k=yes)$. It is not necessary to specify the probability of A solving the problem, if none of the causes $C_1, \ldots, C_k$ are present, as $C_1, \ldots, C_k$ include all the causes that are solvable by A.

As seen in FIG. 8, actions are represented in a Bayesian network as child nodes of the causes they can solve. Thus the node for the action in the Bayesian network represents whether or not the action is able to solve the problem. The causal direction from the cause nodes to the action nodes is then correct, as the presence of causes cause their associated actions to be able to solve the problem.

A conditional probability table for an action A that solves causes $C_1, \ldots, C_3$ is specified in Table 20 below:

TABLE 20

| $C_1$ states | yes | | | | no | | | |
|---|---|---|---|---|---|---|---|---|
| $C_2$ states | yes | | no | | yes | | no | |
| $C_3$ states | yes | no | yes | no | yes | no | yes | no |
| A    yes | .5 | .5 | .5 | $p_1$ | .5 | $p_2$ | $p_3$ | 0 |
| states no | .5 | .5 | .5 | $1-p_1$ | .5 | $1-p_2$ | $1-p_3$ | 1 |

In Table 20, $p_i$ is defined as is set out in Equation 1 below:

Equation 1

$$p_i = P(A=yes|C_i=yes)(1-I_A)$$

Thus, with the single-fault assumption, uniform distributions are specified for all the impossible configurations above where there is more than one cause present. For the configurations where only one cause is present, $p_i$, the probability that the action will solve the problem given this cause, is specified with the inaccuracy subtracted.

The inaccuracy factor represents the probability that the user performs action A incorrectly such that it doesn't solve the problem, even though it had the potential to. It is necessary to incorporate the inaccuracy of actions, as this uncertainty has to be represented. There are actions which are easy to perform incorrectly—giving a high risk of receiving invalid data from the user (the action didn't help!). If the action has a high inaccuracy, the data supplied from the user should be treated with high uncertainty. $I_A$ is subtracted from the probability that the action solves the problem, as a high inaccuracy reduces the probability that the user will discover that the action solved the problem.

Figure 9:
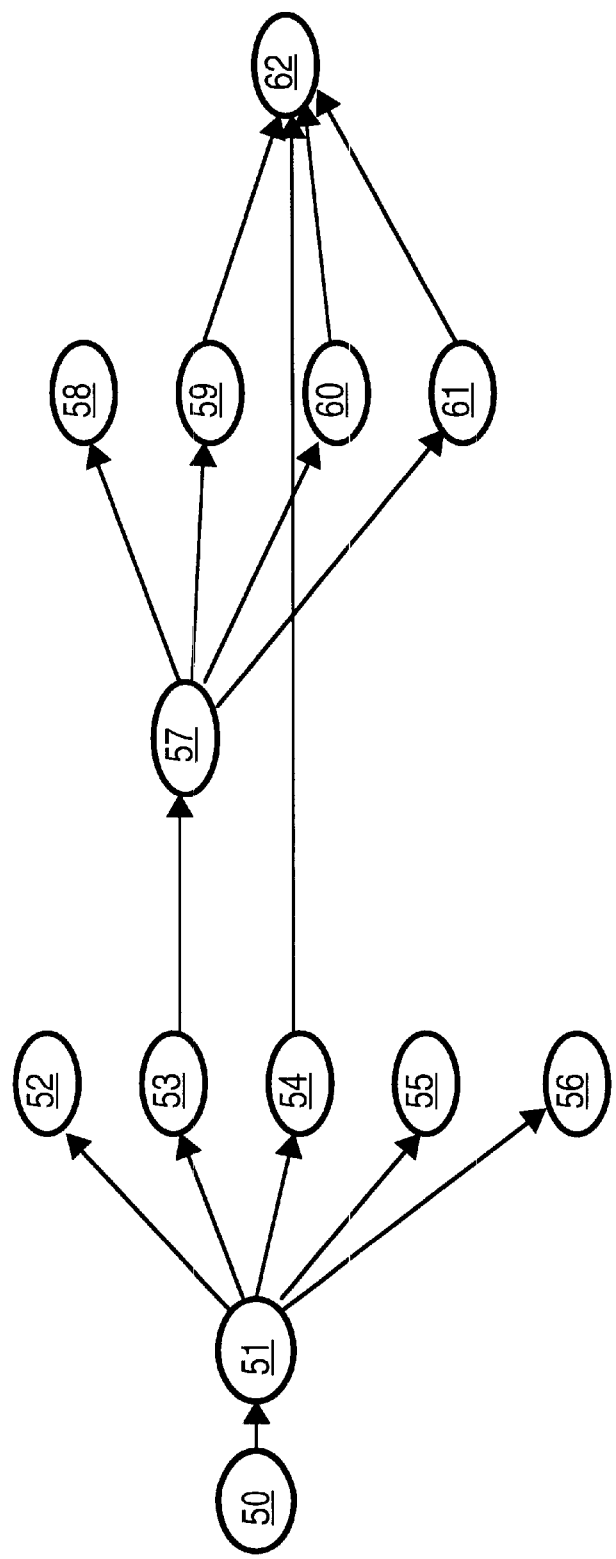
FIG. 9 is an example of a question that models a symptom of causes in a problem domain in accordance with a preferred embodiment of the present invention.

FIG. 9 is an example of a question that models a symptom of causes in the problem domain. Node 51 represents the Each of the nodes 52–56 represents causes. For example, node 52 represents the tray lifting to position. Node 53 represents the tray used incorrectly. Node 54 represents a defective tray. Node 55 represents the feed and separation rollers seated improperly. Node 56 represents other problems.

Node 53 is the parent of node 57 which represents the probability distribution over the subcauses of the tray being used incorrectly. Each of the nodes 58–61 represents subcauses. For example, node 58 represents media out of specification. Node 59 represents tray overfull. Node 60 represents paper size adjustment improperly seated. Node 61 represents tray improperly seated.

Node 62 represents the troubleshooting question "Do you hear abnormal noise?"

Questions have the potential to modify the belief about the most likely and unlikely causes. There are two possible ways to acquire the information for questions depending on the type of the question. If the question naturally pertains to a symptom of one or more causes, or can naturally be seen as an effect of one or more causes, then the probabilities are best elicited by the domain experts as $P(Q|C)$, e.g., "Do you hear abnormal noise" in FIG. 9. If, on the other hand, it is a more general type of question that does not seem to be related to either a symptom or an effect of causes, then the probabilities are best given as $P(C|Q)$, e.g., node 628 in FIG. 8.

However, no matter which way the probabilities are elicited they should be modeled in the same way in the Bayesian network to make sure that all probabilistic information is correctly represented and that the same combination rules are used for the two types of questions.

FIG. 9 shows an example of a question that provides information about a symptom to causes in the problem domain. The node "Do you hear abnormal noise?" requests information from the user about abnormal noise from the printer that can potentially be caused by some of the "Tray 2 lifting" causes, e.g., an overfull tray, paper size adjustment brackets improperly seated, an improperly seated tray, or a defective tray.

This type of question is modeled as a child node of the causes that can cause the symptom requested by the question. For each possible cause, a probability is specified that it causes the symptom to be present, and there is also specified a probability that the symptom is present if none of the specified causes are present (i.e., the leak probability). For the question node 62 in FIG. 9, the conditional probability table is as is set out in Table 21 below:

TABLE 21

| "Tray overfull" states | Yes (Y) | | | | | | | | No (N) | | | | | | | |
|---|---|---|---|---|---|---|---|---|---|---|---|---|---|---|---|---|
| "Paper size . . ." states | Y | | | | N | | | | Y | | | | N | | | |
| "Tray improp. seated" states | Y | | N | | Y | | N | | Y | | N | | Y | | N | |
| "Defective tray" states | Y | N | Y | N | Y | N | Y | N | Y | N | Y | N | Y | N | Y | N |
| Do you  Y | .5 | .5 | .5 | .5 | .5 | .5 | .5 | $x_1$ | .5 | .5 | .5 | $x_2$ | .5 | $x_3$ | $x_4$ | y |
| hear  N | .5 | .5 | .5 | .5 | .5 | .5 | .5 | $1-x_1$ | .5 | .5 | .5 | $1-x_2$ | .5 | $1-x_3$ | $1-x_4$ | $1-y$ |
| abnormal noise? | | | | | | | | | | | | | | | | | problem domain that the front panel eror code is at "Tray 2 lifting". Node 51 is the parent of node 52 which represents the probability distribution over the causes of Tray 2 lifting.

In Table 21, uniform probabilities are given for the combinations that are impossible, and for the combinations where only one cause is present ($x_1, \ldots, x_4$), the probability of the symptom is p(Q=yes|C=yes).

The y (small case) in the above table is the probability of the symptom if none of the causes are present. This probability will usually be small compared to the x's.

In the modeling of this type of questions, it is assumed that the effects of the causes on the symptom are independent, so that the maximum of the probabilities can be used. If there are causes that have dependent effects on the cause, it is easy to replace the maximum probability with a probability that represents their combined probability of causing the symptom.

Implementation of general questions in the Bayesian network is more complicated as it is necessary to reverse the direction of the acquired probabilities.

The model for the printer network card in FIG. 8 contains a question, node 628, "Is the network card supported?". If this question is answered yes, it causes the probability of the cause "Unsupported network card" to go to zero, and if it is answered no, it causes the probability of the cause to go up. This question only affects the probability of a single cause, but it is easy to imagine questions that affect the probabilities of multiple causes, e.g., "Do you hear unusual noise from the printer?".

Table 22 below shows the acquired probabilities for node 610 in FIG. 8 that specifies the probabilities of the causes in the printer network card.

TABLE 22

| "Is the NW card supported?" (628) states | — | yes | | no | |
|---|---|---|---|---|---|
| "Printer NW card component" (609) states | — | yes | no | yes | no |
| "Printer NW card causes" (610) states | | | | | |
| Defective | $u_1$ | | 0 | | 0 |
| NW O/S/card incompatibility | $u_2$ | | 0 | | 0 |
| Unsupported NW card | $u_3$ | $x_3$ | 0 | $y_3$ | 0 |
| NW card settings incorrect | $u_4$ | | 0 | | 0 |
| Not seated properly | $u_5$ | | 0 | | 0 |
| Other printer problem | $u_6$ | | 0 | | 0 |
| Printer turned off | $u_7$ | | 0 | | 0 |
| Firmware on NW card needs updating | $u_8$ | | 0 | | 0 |
| Firmware on NW card corrupt | $u_9$ | | 0 | | 0 |
| NVRAM on NW card corrupt | $u_{10}$ | | 0 | | 0 |
| N/A | | 0 | 1 | 0 | 1 |

In Table 22, the u's signify the probabilities of the causes when it is known that there is something wrong with the network card but unconditioned on the question node 628.

$x_3$ and $y_3$ are the probabilities of the third cause (unsupported network card) conditioned on respectively the question answered yes and no. The remaining fields are left blank by the domain experts who only specify the changes in probability for those causes that the question is directly associated with. In this case, knowing that the network card is supported, the probability that the cause is "unsupported network card" becomes close to zero (non-zero due to the inaccuracy), and knowing that the network card is not supported, makes the probability of the cause higher than the unconditional probability, $u_3$.

The domain experts also give the probabilities of the answers of the question, P(Q), as set out in Table 23 below:

TABLE 23

| "Is the NW card supported" (628) states | |
|---|---|
| yes | no |
| 0.9 | 0.1 |

If the set of causes associated with Q is labeled, $S_Q$ ("unsupported network card" in this case), the following pieces of information are known: $P(S_Q)$, $P(S_Q|Q)$, and $P(Q)$.

Probability calculus indicates as is set out in Equation 2 below:

Equation 2

$$P(S_Q) = \sum_Q P(S_Q|Q)P(Q)$$

Since the domain experts have specified the three probability distributions independently of each other, there is a chance of inconsistent information, i.e., that the above formula does not hold for the elicited probabilities.

This gives a chance to perform a consistency check on the domain experts and give some additional guidance in providing these probabilities. Probably the most accurate of the three elicited probabilities is the unconditional probabilities of the causes $P(S_Q)$, the domain expert to modifies either $P(S_Q|Q)$, P(Q) or both until Equation 1 holds. It is also possible to automatically suggest two or more correct modifications of the distributions that the domain expert can choose between.

Assuming that the values of $P(S_Q)$, $P(S_Q|Q)$ and P(Q) obtained by choosing one of the suggestions or through stepwise revision by the domain expert are consistent, the direction of the reasoning by Bayes' formula can be reversed, as set out in Equation 3 below:

$$P(Q|S_Q) = P(Q|S_Q, I_{C_Q}) = \frac{P(S_Q|Q, I_{C_Q})P(Q)}{P(S_Q|I_{C_Q})} \quad \text{Equation 3}$$

In Equation 3, $I_{C_Q}$ is the indicator variable specifying whether or not the cause is in the set $S_Q$ having states yes and no, see, e.g., nodes 528 and 529 in FIG. 8. The probability distributions of the causes in $S_Q$ are conditional on this indicator variable. They have the probabilities specified by the domain experts if the indicator variable is yes, and zero probability otherwise. The prior probabilities of the question, P(Q), are assumed to be the same whether the indicator variable is yes or no, that is $P(Q)=P(Q|I_{C_Q})$ If it is known that one of the causes in $S_Q$ is present, then $I_{C_Q}$=yes, and if it is known that none of the causes in $S_Q$ are present, then $I_{C_Q}$=no, thus Q is independent of $I_{C_Q}$ if $S_Q$ is given. This implies that $P(Q|S_Q)=P(Q|S_Q, I_{C_Q})$ as seen in Equation 3.

Thus, the question can be implemented in the Bayesian network by creating a node Q that is a child of the causes associated with it ($S_Q$), and using the probabilities of Equation 3.

If there are multiple questions affecting the same set of causes, they are usually independent given the causes so their probabilities can be elicited independently from each other, and they can be implemented as specified by Equation 3 independently of each other.

If there are multiple dependent questions affecting the same set of causes, it is necessary to specify the probabilities of the causes given all joint configurations of the questions. Thus, there is now a set of dependent questions, Q, and a set of associated causes, $S_Q$. The domain expert elicits the probability distributions, $P(S_Q)$, $P(Q)$, and $P(S_Q|Q)$, and the arc between the questions and causes can be reversed to obtain $P(Q|S_Q)$.

This method is sufficient if there is a low number of questions in the set, Q, but if there are several it may be better to represent the questions with their dependency structure in the Bayesian network instead of as a single node with joint state space. In this case, a number of more complicated arc reversals have to be performed to reverse the directions of arcs between questions and causes.

Questions may also influence several sets of causes in which case things get more complex. In this situation there is, for example, two sets of causes, $S_Q{}^1$ and $S_Q{}^2$, that are associated with the question Q. Thus, there are five probability distributions, $P(S_Q{}^1|I_{CQ}{}^1)$, $P(S_Q{}^2|I_{CQ}{}^2)$, $P(S_Q{}^1|Q, I_{CQ}{}^1)$, $P(S_Q{}^2|Q, I_{CQ}{}^2)$, and $P(Q)$.

FIGS. 10A through 10E graphically illustrates a series of arc-reversals reversing the direction from question to causes. An arc-reversal is an operation that reverses an arc in a Bayesian network from A to B while adding the parents of A to B, and vice-versa. See Shachter, R. D., Evaluating Influence Diagrams. *Operations Research* 34 (6), 871–882 (1986).

In FIGS. 10A through 10E, there is a question Q that affects two sets of causes $S_Q{}^1$ and $S_Q{}^2$. $S_Q{}^1$ contains the causes $C_1$ and $C_2$, and $S_Q{}^2$ contains the causes $C_3$ and $C_4$, thus Q may affect any subset of $C_1, C_2, C_3, C_4$.

Figure 10A:
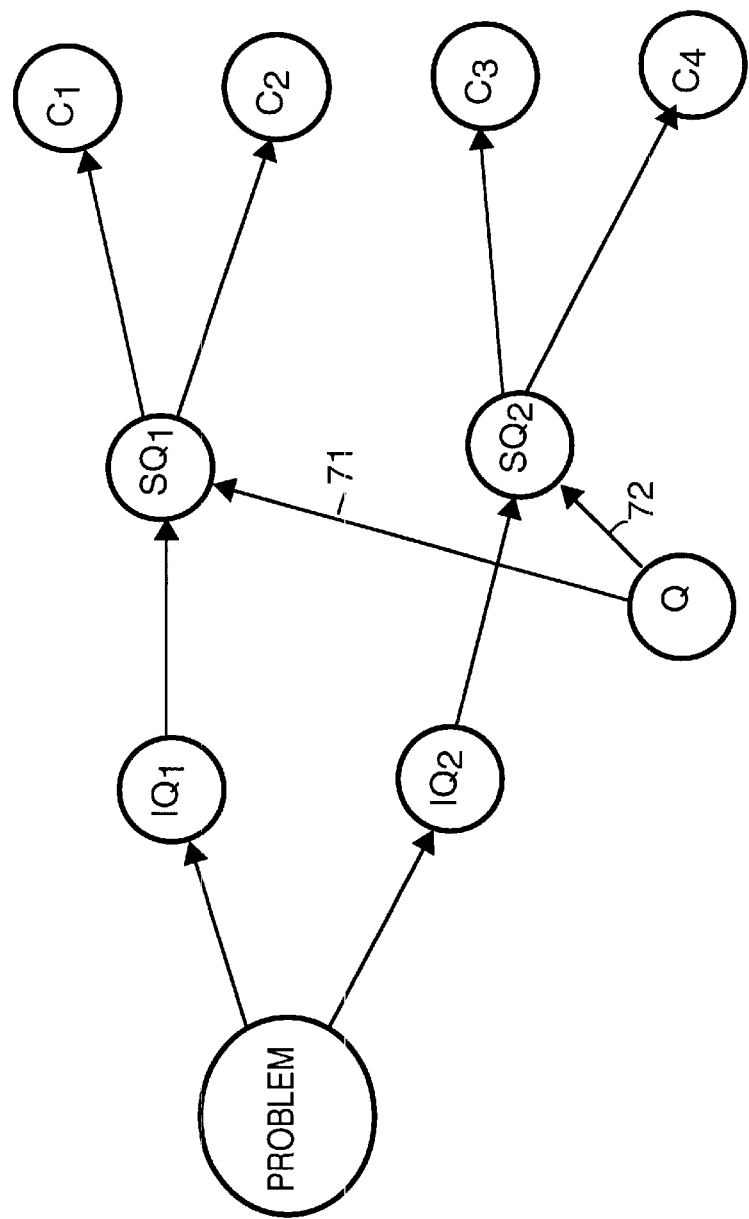
FIGS. 10A, 10B, 10C, 10D and 10E graphically illustrate a series of arc-reversals reversing the direction from question to causes in accordance with a preferred embodiment of the present invention.

FIG. 10A, shows the initial Bayesian network with the arcs 71 and 72 directed from the question towards the causes.

Figure 10B:
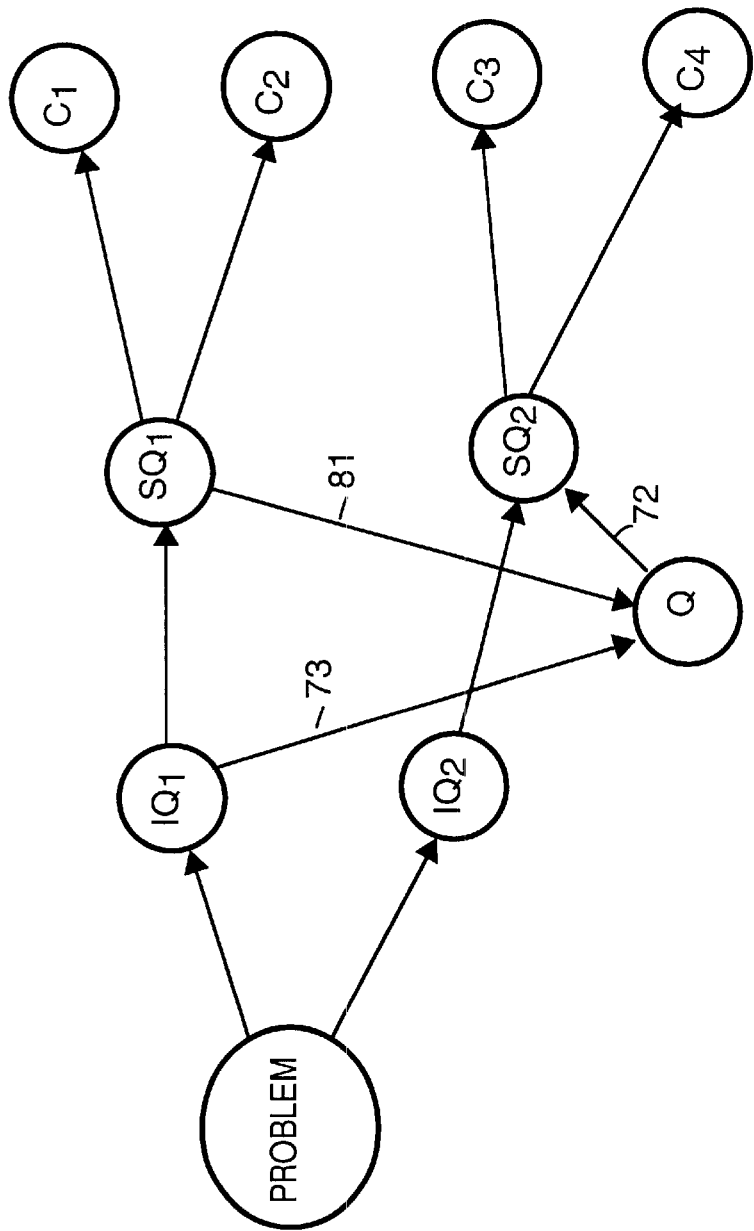
Figure 10C:
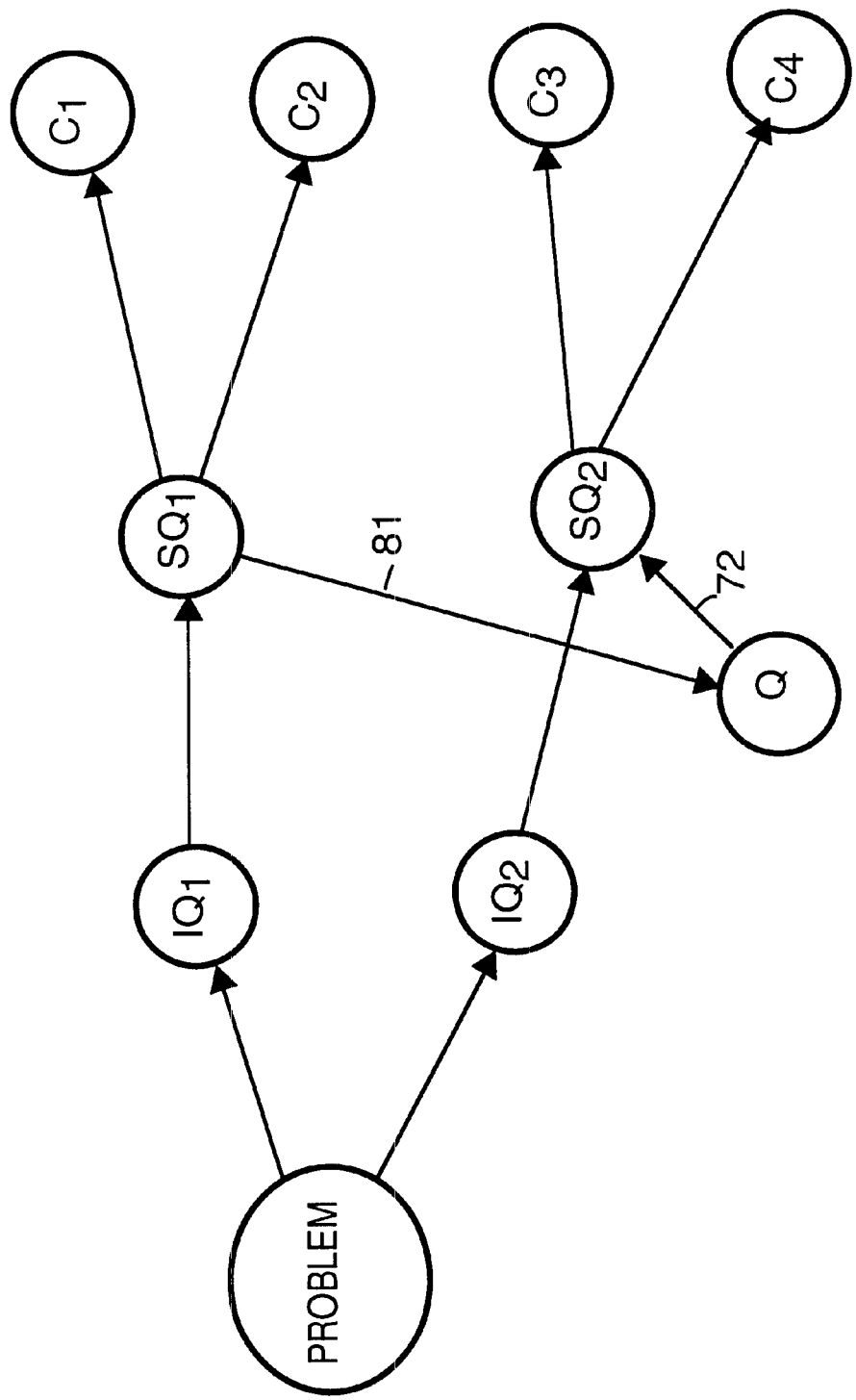

FIG. 10B, shows reversed arc 81 and in the process added all parents of $S_Q{}^1$ ($IQ^1$) to Q, i.e., arc 73. As mentioned earlier, Q is independent of $IQ^1$ conditional on $S_Q{}^1$, so arc 73 can be removed as shown in FIG. 10C.

Figure 10D:
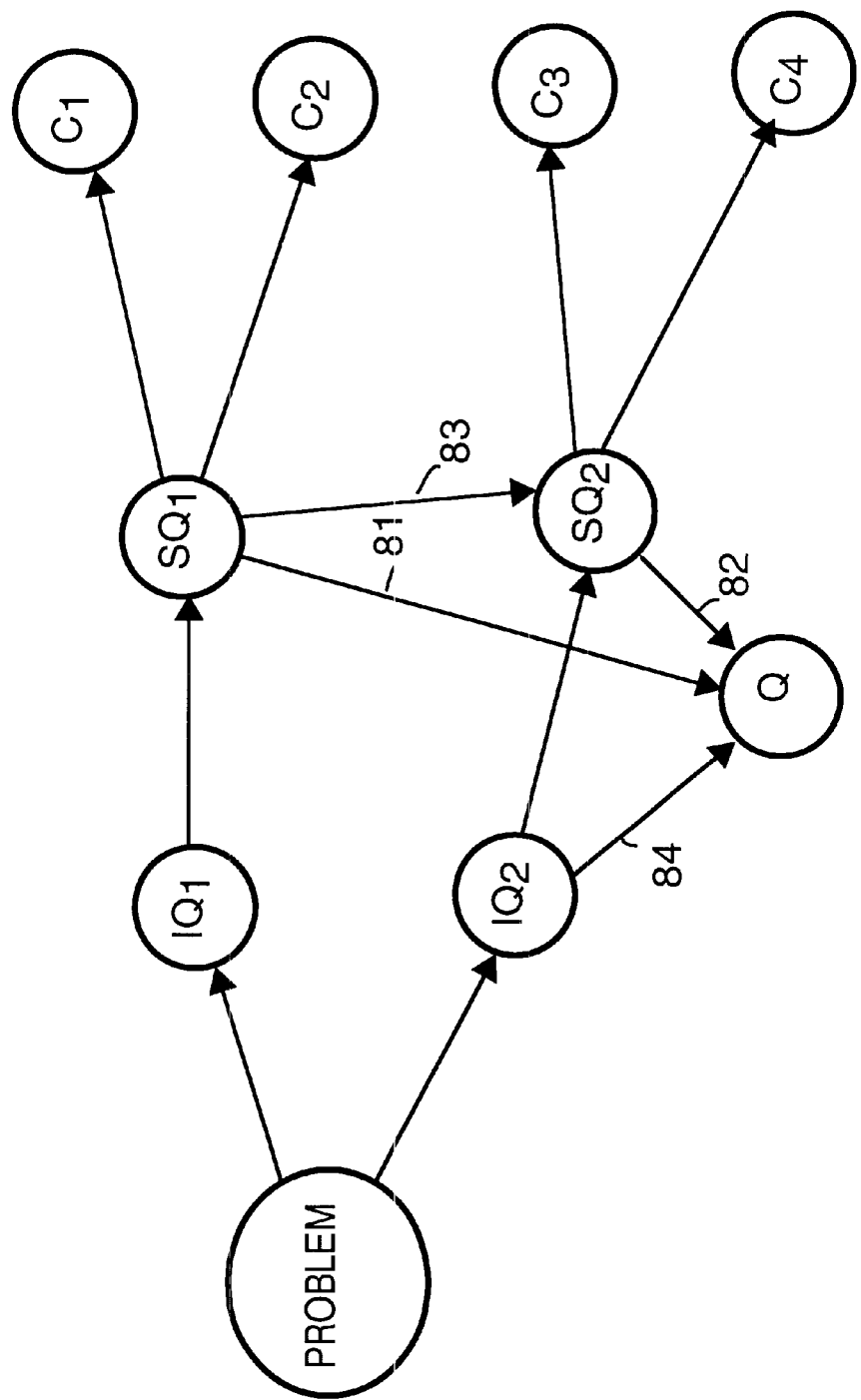
Figure 10E:
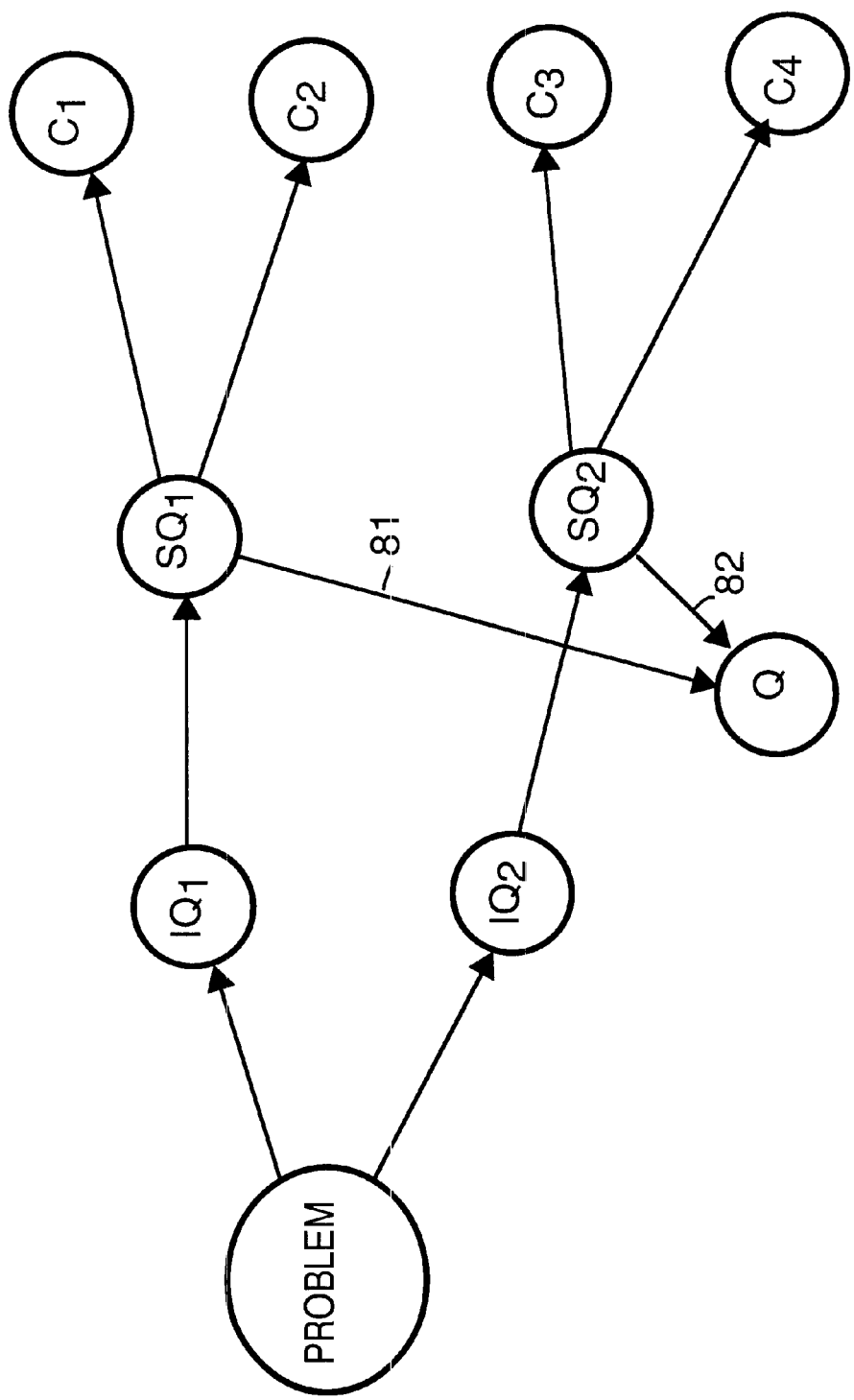

FIG. 10D shows reversed arc 82 from Q to $S_Q{}^2$ and in the process added the parents of $S_Q{}^2$ ($IQ^2$), arc 84, and added the parents of Q ($S_Q{}^1$) to $S_Q{}^2$, arc 83. Again, arc 84 can be removed as Q is independent of $IQ^2$ conditional on $S_Q{}^2$. Similarly, arc 83 can be removed as $S_Q{}^2$ is independent of $S_Q{}^1$ conditional on $IQ^2$, as if $IQ^2$=yes, $S_Q{}^1$ will be fixed in its no state, and if $IQ^2$=no, $S_Q{}^2$ will be fixed in its no state and $S_Q{}^1$ can have no influence on it. The result is shown in FIG. 10E.

In general, if there is a question affecting multiple sets, there will be added extra arcs from indicator variables to the question, and extra arcs between causes. All these arcs can be removed due to the independence relations in the Bayesian network.

As shown by FIG. 5, there are several interactions between Bayesian network models 21 through 25. From FIG. 5 it can be seen that the dataflow can be a "cause" in both the unexpected output, the errorcode and the miscellaneous model categories. For instance, several categories of unexpected output can be caused by a corruption of the print job somewhere in the dataflow, i.e., as one of the causes in the model for the unexpected output category, there is the problem defining node of the "corrupt output" version of the dataflow (node 500 in FIG. 7). The combined model will then immediately work as a single troubleshooting model, combining the troubleshooting steps of the unexpected output category with those of the dataflow.

Another interaction between models can occur when there are common causes of problems, or common subcauses of causes. Even though the single-fault assumption is made, there can be these situations; however, the common cause would then only be able to cause one problem at a time.

Figure 11:
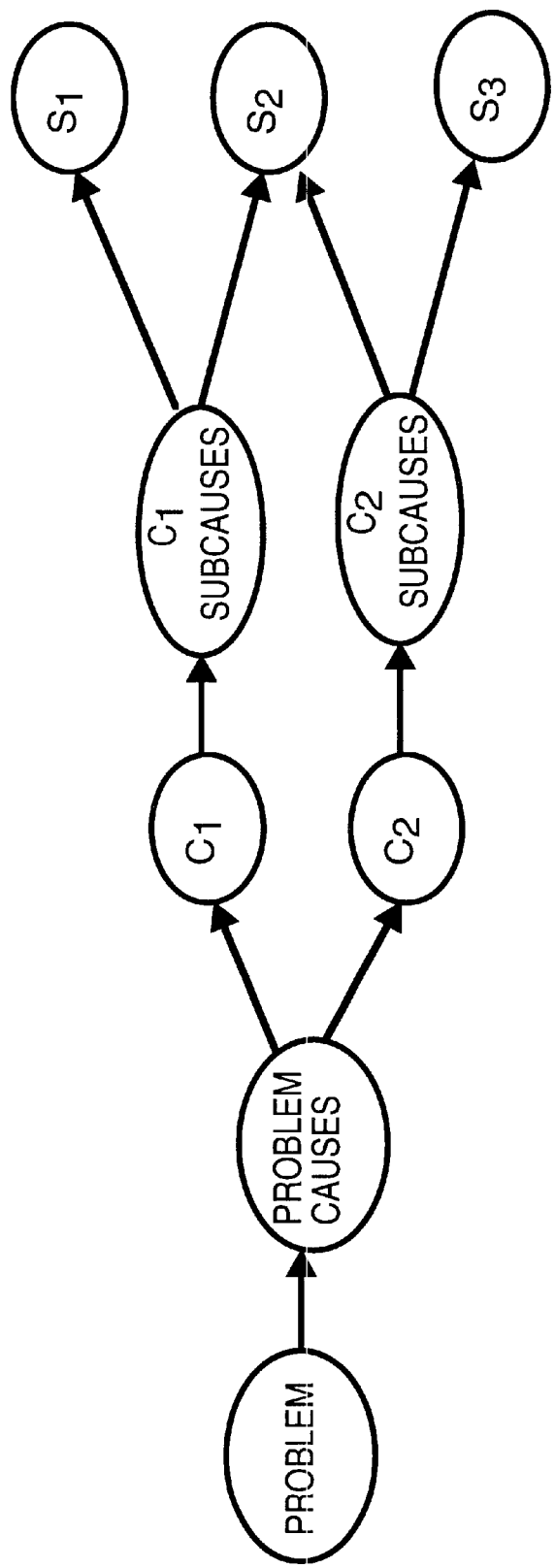
FIG. 11 illustrates the situation where there are common causes of problems, or common subcauses of causes in accordance with a preferred embodiment of the present invention.

The situation is illustrated in FIG. 11. FIG. 11 shows a subcause, $S_2$, which is a subcause of both causes $C_1$ and $C_2$; however, $S_2$ can only cause one of them at a time, due to the single-fault assumption.

The conditional probability table for $S_2$ in FIG. 11 is as set out in Table 24 below:

TABLE 24

| "$C_1$-subcauses" states | $S_1$ | | | $S_2$ | | | N/A | | |
|---|---|---|---|---|---|---|---|---|---|
| "$C_2$-subcauses" states | $S_1$ | $S_2$ | N/A | $S_1$ | $S_2$ | N/A | $S_1$ | S2 | N/A |
| "$S_2$" yes | 0 | 0 | 0 | 0 | 1 | 1 | 0 | 1 | 0 |
| states no | 1 | 1 | 1 | 1 | 0 | 0 | 1 | 0 | 1 |

So, only when both parents agree on $S_2$, or one is $S_2$ and the other nothing, will the node "$S_2$" be in state yes. In the model it is specified the probability that $S_2$ is the underlying cause given $C_1$, and the probability that $S_2$ is the underlying cause given $C_2$. The true probability that $S_2$ is present, is then the sum of the probabilities that $S_2$ causes $C_1$ and that $S_2$ causes $C_2$.

An example of this from the printer domain is "Corrupt operating system" which has the potential to cause corruption of the print job at several places in the dataflow model, e.g., at the application, the printer driver, and the network driver. However, given the single-fault assumption, a corrupt operating system can only cause the print job to stop in one of these places, thus this cause basically has a state for each of the places where it can cause the job to stop, and it can only be in one of these states.

It is easy to lift the single-fault assumption in the above scheme for specific scenarios. As described above, there are nodes representing the subcauses of a cause (or the causes of a problem) such that there is a cause for each state of the node. It is quite easy to extend this scheme such that this node also has states for co-occurences of causes. For instance, if cause C has subcauses $S_1$, $S_2$, and $S_3$, a node is needed to represent the probabilities of the subcauses given the cause, C. This looks as is shown in Table 25 below:

TABLE 25

| | "C" states | |
|---|---|---|
| "C subcauses" states | yes | no |
| $S_1$ | $x_1$ | 0 |
| $S_2$ | $x_2$ | 0 |
| $S_3$ | $x_3$ | 0 |
| N/A | 0 | 1 |

If it is known that subcauses $S_1$ and $S_2$ can occasionally be present simultaneously, it is easy to make an extra field in Table 25, in order to produce the configuration shown in Table 26 below.

TABLE 26

| | "C" states | |
|---|---|---|
| "C subcauses" states | yes | no |
| $S_1$ | $x_1$ | 0 |
| $S_2$ | $x_2$ | 0 |
| $S_3$ | $x_3$ | 0 |
| $S_1$ & $S_2$ | $x_4$ | 0 |
| N/A | 0 | 1 |

If the single-fault assumption is lifted in general, probabilities for all possible combinations of causes are required, i.e., two times the causes which can be an extremely large number. To avoid elicitation of all these joint probabilities by domain experts, all causes can be assumed independent in which case the probability of combinations of causes can be found by multiplying the probabilities of the causes occurring by themselves.

Figure 12:
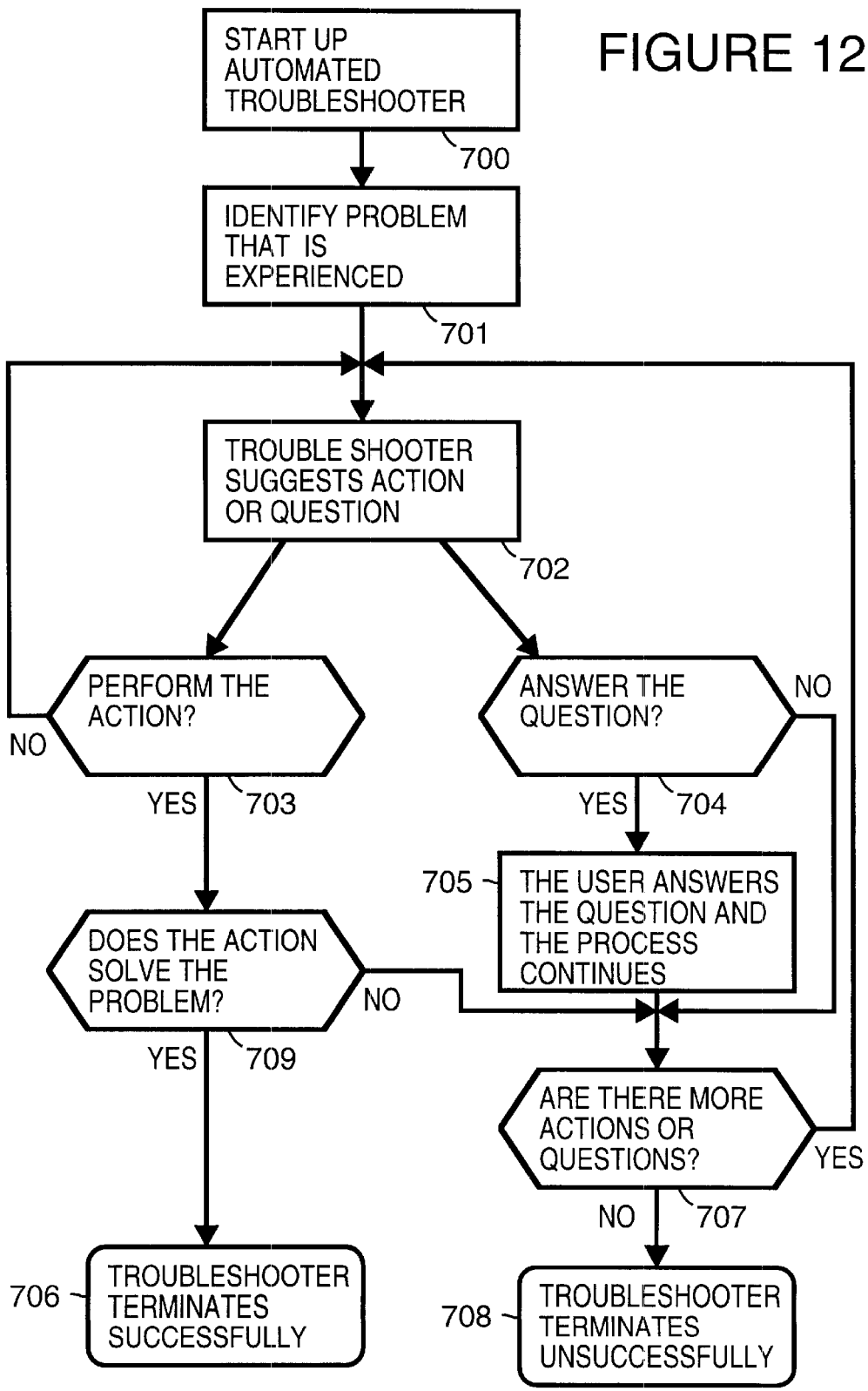
FIG. 12 is an overview of the troubleshooting process as it is experienced by the user in accordance with a preferred embodiment of the present invention.

FIG. 12 is an overview of the troubleshooting process as it is experienced by the user. In a step, the troubleshooter is initiated by the user, either through a world wide web user interface or as a stand alone executable on the user's own computer. In a step 701, the user interface guides the user to an identification of the problem that he is experiencing. This can be done in several ways, menu systems, graphical pictures for identification of the unexpected output, etc. In a step 702, the user now enters the main loop of the troubleshooter, where the troubleshooter first suggests either an action or a question and the user then responds to this (possibly after performing some sequence of actions). In a step 703 and a step 704, the user can choose not to perform the suggestions, if he is unable to perform it, or simply doesn't want to at the moment.

After the user has performed an action, he inputs to the troubleshooter, in a step 709, whether or not the action solved the problem. If the action solved the problem, the troubleshooter terminates successfully in step 706, but if the action does not solve the problem, the troubleshooter has to check, in step 707, whether there are any remaining actions or questions that have not been suggested. If there are no remaining steps, the troubleshooting process, in step 708, is terminated unsuccessfully. No resolution of the problem could be found. If there are remaining actions or questions, the troubleshooting process, in step 702, is continued. Similarly, if the troubleshooter has suggested a question, the user may decide, in step 704, not to perform the question. Alternatively, in step 705, the user answers the question and the process continues. In step 707 a check is made as to whether there are any more actions or questions that have not been asked.

Figure 13:
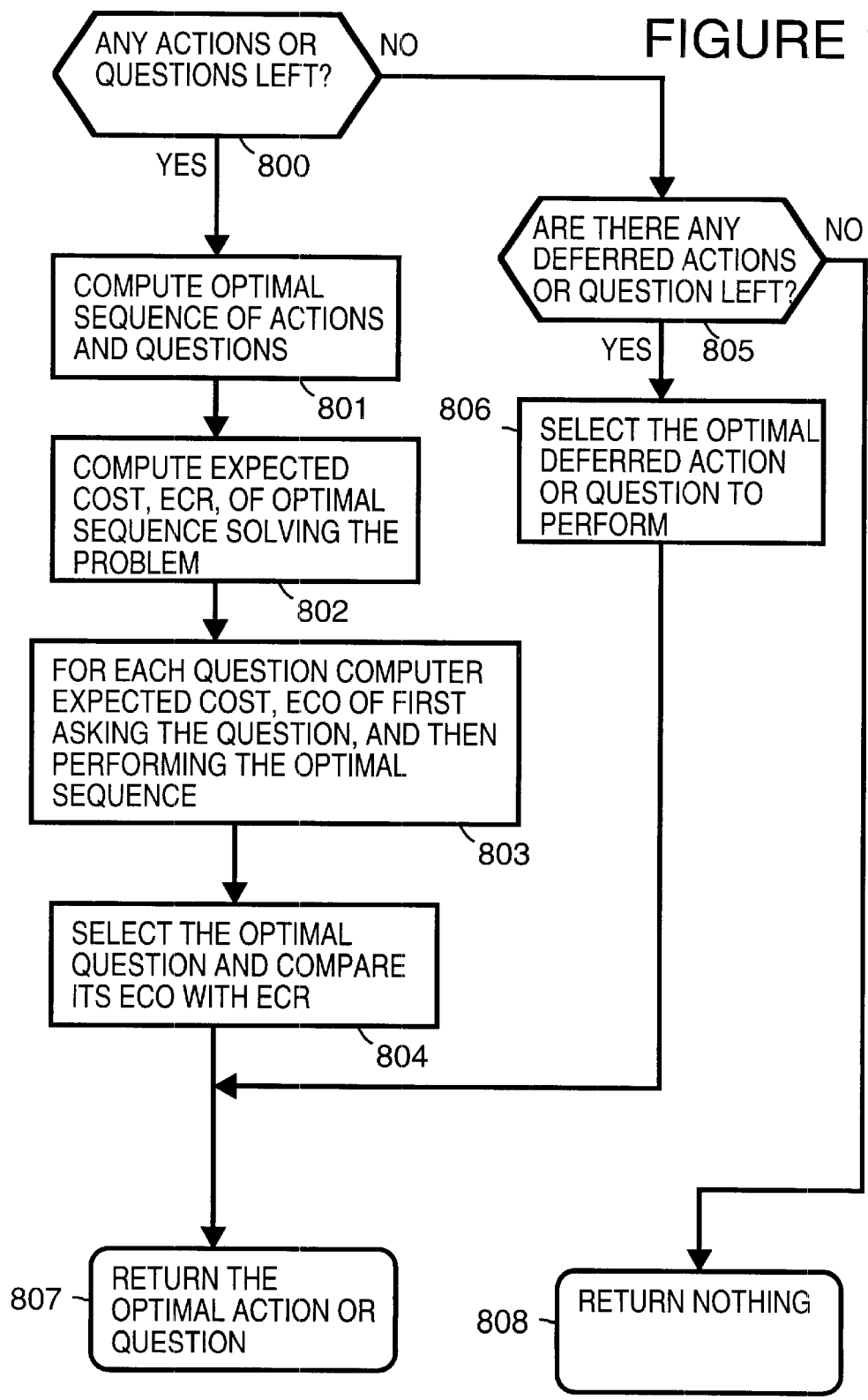
FIG. 13 is an overview of the process of selecting the best next step to perform in accordance with a preferred embodiment of the present invention.

FIG. 13 is an overview of the process of selecting the best next step to perform. FIG. 13 basically covers the substeps performed to implement step 702 and step 707 shown in FIG. 12. In a step 800, a check is made as to whether there are any actions or questions left that have not been suggested yet. If there aren't any left, in a step 805, it is checked whether there are any actions or questions left that have been deferred earlier. If this is the case, in a step 806, the best of these is selected and a return is made in step 807. If there are no deferred actions or questions either, in step 807, nothing is returned, as everything has been tried and there is nothing else to suggest.

If in step 800, it is found that there are still actions or questions left that have not been suggested yet, in step 801 there is computed the optimal sequence of actions and questions. In a step 802, the expected cost (ECR) of executing this optimal sequence until the cause is identified. In a step 803, for each question, there is computed the expected cost (ECO) of first asking the question and then performing the optimal sequence of actions given the answer to the question. In a step 804, the ECO for each question is performed with the ECR of the optimal sequence to see whether there is a question that it is optimal to ask before performing the optimal sequence of actions. The optimal action or question is then finally returned in step 807.

Heckerman et al. 1995 use the concept of components that can be observed and repaired. The term solution actions is used for actions that can solve the problem, and the term information-gathering actions for actions that provide information to the troubleshooting process. Our solution actions thus basically correspond to Heckerman et al. 1995's repairs of components, except that Heckerman et al. 1995 have a one-to-one correspondence between actions and causes, as they directly associate repairs with components. This is not realistic, as in a real-world application there are actions that can solve multiple causes, as well as causes that can be solved by multiple actions.

In FIG. 8, for example, cause 615 "Printer network card not seated properly" can be solved by two actions: an action 623 "Does reseating the network card solve it?" and and action 624 "Does moving the network card to another slot in the printer work?". Also, the action 623 of reseating the network card can solve two causes: cause 615 "Printer network card not seated properly" and cause 617 "Printer turned off".

If the many-to-many relationship between causes and actions is integrated into the models, it will be possible to model more complex scenarios. However, the algorithms of Heckerman et al. 1995 have to be modified.

In Heckerman et al. 1995's algorithm, the optimal component to consider next is the one with the highest ratio, $p_i/C_i$, where $p_i$ is the probability that the component is broken, and $C_i$ is the cost of observing whether component i is broken.

If there is an action $A_i$ that solves cause (component) $C_i$ with probability $p(A_i=yes)$ the ratio can also be expressed as $p(A_i=yes)/C_i$, where $C_i$ is the cost of performing $A_i$. Performing action $A_i$ implies observing (with some uncertainty) whether component $C_i$ is broken (cause $C_i$ is present).

In general, for an action $A_i$ that can solve multiple causes, the ratio can still be expressed as $p(A_i=yes)/C_i$, as $p(A_i=yes)$ expresses the probability that the malfunctioning component (the cause) is repaired and the problem is removed.

Thus, the optimal sequence of independent solution actions can be found by sorting the actions such as in Equation 4 below:

$$\frac{p_1}{C_1} > \frac{p_2}{C_2} > \frac{p_3}{C_3} > \frac{p_4}{C_4} > \frac{p_5}{C_5} > \ldots > \frac{p_N}{C_N} \qquad \text{Equation 4}$$

where $p_1=p(A_1=yes)$.

Figure 14:
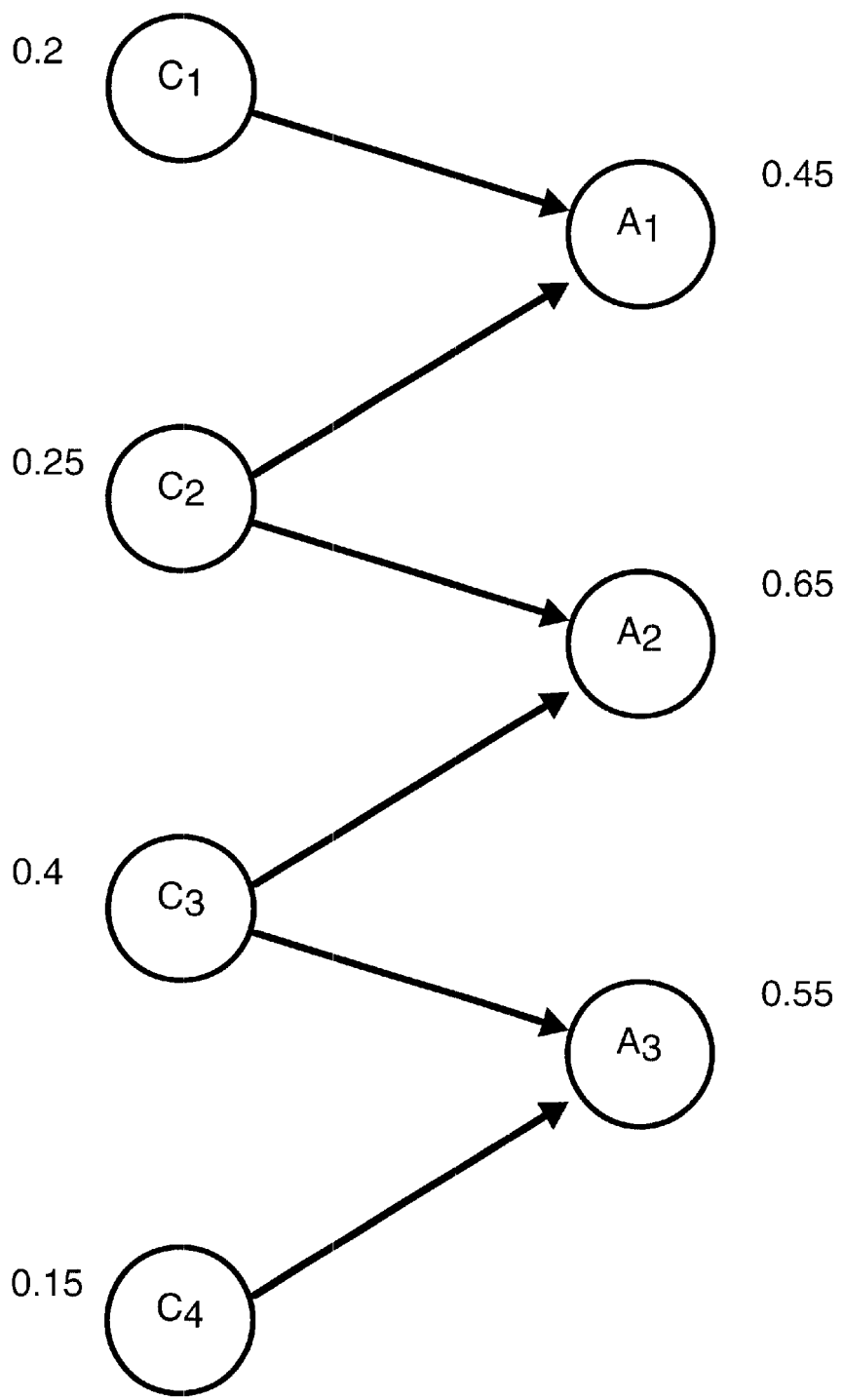
FIG. 14 illustrates a case there are four causes ($C_1$, $C_2$, $C_3$ and $C_4$) that can be solved by three actions ($A_1$, $A_2$, $A_3$).

Thus, the optimal action can be found as the first action in this sequence. However, this only works when the actions are independent which is not the case in our application, as illustrated by FIG. 14.

As mentioned earlier, the optimal question can be found by comparing the expected cost of repair (ECR) when performing the above sequence of actions with the expected cost of first performing an observation and then performing the optimal sequence of actions based on the result (ECO). If ECO for the question is lower than ECR, then it is obviously best to perform the observation first.

Heckerman et al. 1995 find the expected cost of repair of the optimal sequence (ECR) as set out in Equation 5 below:

Equation 5

$$ECR = C_1 + (1-p_1)C_2 + (1-p_1-p_2)C_3 + \ldots + (1-p_1- \ldots -p_{N-1})C_N \quad (5)$$

As Heckerman et al. 1995 has a one-to-one correspondence between actions and components, and also follows the single-fault assumption, the probabilities $p_1, \ldots, p_N$ sums to 1, and $p_i=p(A_i=y, A_j=n, j\neq i)$. Equation 5 cannot be used when there are actions that can solve multiple causes, as the sum of these actions solving the problem can be greater than 1.

Also, when there are actions that can solve more than one cause, the simple formula in Equation 5 is not sufficient.

Consider FIG. 14 where there are four causes ($C_1$, $C_2$, $C_3$ and $C_4$) that can be solved by three actions ($A_1$, $A_2$, $A_3$). The actions are assumed to have probability 1 of solving the causes they are connected to, c.i., $p(A_1=yes|C_1=yes)=1$, $p(A_1=yes|C_2=yes)=1$, $p(A_2=yes|C_2=yes)=1$, etc. The probability of an action solving the problem will then be the sum of the probabilities of the causes that it solves. The probabilities of causes and actions are shown next to them in FIG. 14. Assuming that the actions have equal costs, the optimal sequence according to Equation 4 is $A_2$, $A_3$, $A_1$. However, this is incorrect as when $A_2$ has been unsuccessfully performed, the probabilities of causes $C_2$ and $C_3$ go to zero, changing the probabilities of $A_1$, and $A_3$ to 0.2 and 0.15 respectively, such that the optimal sequence is $A_2$, $A_1$, $A_3$. In general, it is necessary to take into account that probabilities of actions change when previous actions have been performed unsuccessfully. This can be obtained by rewriting Equation 5 as set out in Equation 6 below:

Equation 6

$ECR = C_1 + (1-p(A_1=y))C_2$
$+ (1-p(A_1=y)-p(A_2=y,A_1=n))C_3$
$+ (1-p(A_1=y)-p(A_2=y,A_1=n)-p(A_3=y,A_1=n,A_2=n))C_4 + \ldots$
$+ (1-p(A_1=y)-\ldots-p(A_{N-1}=y,A_{N-2}=n,\ldots,A_1=n))C_N$ Equation 6 can be transformed to Equation 7, set out below:

Equation 7

$ECR = C_1 + (1-p(A_1=y))C_2$
$+ (1-p(A_1=y)-p(A_2=y|A_1=n) \times p(A_1=n))C_3$
$+ (1-p(A_1=y)-p(A_2=y|A_1=n) \times p(A_1=n)-p(A_3=y|A_1=n,A_2=n) \times p(A_2=n|A_1=n) \times p(A_1=n))C_4$
$+ \ldots + (1-p(A_1=y)-\ldots-p(A_{N-1}=y|A_{N-2}=n,\ldots,A_1=n) \times p(A_{N-2}=n|A_{N-3}$
$=n,\ldots,A_1=n) \times \ldots \times p(A_1=n))C_N$ Thus, when computing Equation 7, it is necessary to do a step-wise updating of the probabilities for actions, as initially there is only the probability $p(A_i=yes)$ for each action. This can be done exact by finding $p(A_1=yes)$, inserting evidence that $A_1=no$, updating all beliefs, finding $p(A_2=yes|A_1=no)$, inserting evidence that $A_2=no$, updating all beliefs, finding $p(A_3=yes|A_2=no,A_1=no)$, etc., which will get all the necessary probabilities for computing ECR according to Equation 7.

However, this is not practical as the ECR has to be computed once for each state of each question in each cycle of the algorithm in FIG. 12. There is an approximation that can be used to speed up the calculations of the above formula. At each step in computing Equation 7, it is basically needed to update the probabilities that the remaining actions will solve the problem, given that the last action did not help.

There is a simple correspondence between causes and actions, such that for each action there is a list of causes that it has a probability of solving.

Figure 15:
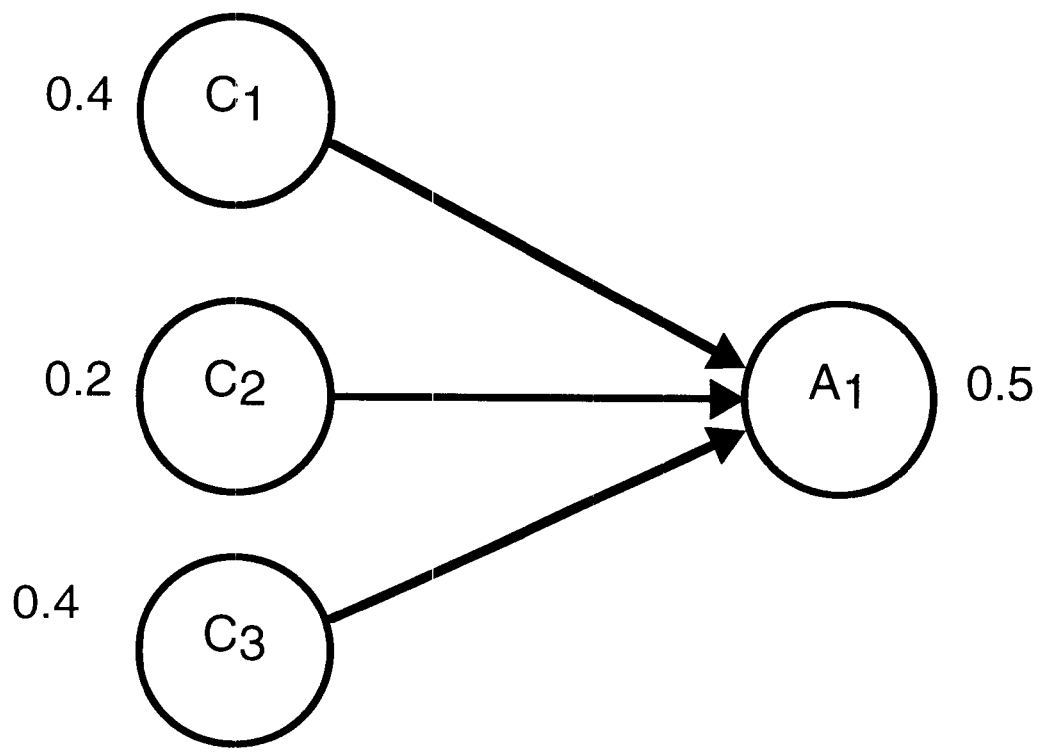
FIG. 15 illustrates the case where there is an action ($A_1$) that can solve three causes, ($C_1$, $C_2$ and $C_3$).

For example, in FIG. 15, there is an action ($A_1$) that can solve three causes, ($C_1$, $C_2$ and $C_3$). The probabilities $p(C_1=y)$, $p(C_2=y)$, $p(C_3=y)$, and $p(A_1=y)$ are shown next to the corresponding nodes. Thus:

$p(A_1=y)=p(A_1=y|C_1=y \text{ or } C_2=y \text{ or } C_3=y) \times p(C_1=y \text{ or } C_2=y \text{ or } C_3=y) =$
$p(A_1=y|C_1=y) \times p(C_1=y) + p(A_1=y|C_2=y) \times p(C_2=y) + p(A_1=y|C_3=y) \times p(C_3=y).$ For example, in FIG. 15, $p(A_1=y|C_1=y)=0.5$, $P(A_1=y|C_2=y)=1.0$, $P(A_1=y|C_3=y)=0.25$, i.e., $p(A_1=y)=0.5 \times 0.4 + 1.0 \times 0.2 + 0.25 \times 0.4 = 0.5.$ This simple relationship between causes and actions can be used to approximate the effect on causes when an action fails ($A_i=n$). When an action fails, the probabilities of the causes that it could solve decrease, and the probabilities of the remaining causes increase accordingly such that the sum is still 1 (by the single-fault assumption). Thus, before troubleshooting starts, the likelihood ratio is recorded in Equation 8 below for each action (A) and cause (C) that A can solve, of the relative decrease in $p(C=y)$ when A fails:

$$\delta_{C,A} = \frac{p(C=y|A=n)}{p(C=y)} \qquad \text{Equation 8}$$

The probabilities of causes given the failure of an action in Equation 7, are then approximated by multiplying factor (Equation 8) on to the probabilities of causes, as in Equation 9 below:

$$p(C = y | A = n, e) = \frac{p(C = y | e)p(A = n | C = y, e)}{p(A = n | e)} \quad \text{Equation 9}$$

$$= \frac{p(C = y | e)p(C = y | A = n, e)}{p(C = y | e)} \cup$$

$$p(C = y | e)\frac{p(C = y | A = n)}{p(C = y)}$$

$$= p(C = y | e) \leftrightarrow \delta_{C,A}$$

Thus, if $A_i$ can solve causes $C_1, \ldots, C_k$, $p(A_i=y|A_j=n)=$ $p(A_i=y|C_1$ $=y,A_j=n) \times p$ $(C_1=y|A_j=n) + \ldots +$ $p(A_i=y|C_k=y,A_j$ $=n) \times p(C_k=y|A_j=n)$ $\approx p(A_i=y|C_1=y,A_j$ $=n) \times p(C_1=y) \times$ $\delta_{C_1,A_j} + \ldots + p$ $(A_i=y|C_k=y,A_j=n) \times$ $p(C_k=y) \times \delta_{C_k,A_j}$ However, in Equation 9 the probabilities $p(A_i=y|C_1=y,A_j=n), \ldots, p(A_i=y|C_k=y,A_j=n)$ are needed which cannot be directly read from the Bayesian network model, if evidence of $A_j=n$ has not been inserted, and the beliefs updated correspondingly. These can also be approximated as in Equation 10 below:

Equation 10

$p(A_i=y|C_1=y,A_j=n) \approx p(A_i=y|C_1=y)$

This is a satisfactory approximation, as the fact that a cause is present ($C_1=y$) forces the probabilities of all other causes to be zero (due to the single-fault assumption) and as the probabilities of all causes are then determined, the probabilities of all actions will also be. It then makes no difference if it is known whether one of the actions failed.

Thus, using the approximations in Equation 9 and Equation 10, the expected cost of performing the optimal sequence of actions can be computed using Equation 7 with a single propagation, when there are causes that can be solved by several actions, and actions that can solve several causes.

To compute ECR it is necessary to find the optimal sequence of actions first. Equation 7 is used to determine ECR. Equation 7 can also be used to find a good sequence of actions using the following step-wise algorithm set out in Table 27 below:

TABLE 27

Find first action $A_1$ as the one with highest $p_i/C_i$.
i = 0 to #actions
  Recompute probabilities of causes assuming $A_{i-1}$ = no (fails),
    see Equation 9
  Find action $A_i$ as the one with highest $p(A_i = \text{yes} | A_1 = \text{no}, \ldots, A_{i-1} = \text{no})/C_i$.

Due to the fact that actions can be dependent here, this algorithm, however, cannot be guaranteed to find the optimal sequence. In practice, however, the sequence is usually quite adequate. If required, the algorithm can be extended with n-step lookahead implemented with, e.g., dynamic programming.

In the Heckerman et al. 1995 algorithm, the selection of questions is based on computing the expected cost (ECO) of first asking the question Q and then performing an optimal sequence of actions based on the answer to the question, e.g., for a question Q with cost $C_Q$ and answers yes and no, as set out in Equation 11 below:

Equation 11

$$ECO_Q = C_Q + ECR_Q = \text{yes} \times p(Q=\text{yes}|e) + ECR_Q = \text{no} \times p(Q=\text{no}|e)$$

Computing $ECO_Q$ for all questions in the troubleshooting model requires one belief propagation for each state of each question. This is not practical if there are many questions, e.g., for the dataflow model illustrated in FIG. 7 with 20–30 questions, this computation takes in the order of 15 seconds on a Pentium 166 MHz PC which is more than the average user is willing to wait. There is hope of resolving this problem with faster computers, but if even more questions are included in a single model, the problem grows exponentially.

The problem is caused by having to precompute the probabilities of actions solving the problem $p(A=\text{yes}|Q=s,e)$ given the observation of a question Q in state s and evidence e. This probability can be approximated by utilizing Bayes' formula and the single-fault assumption, as in Equation 12 below:

$$p(A = \text{yes} | Q = s, e) = \quad \text{Equation 12}$$

$$\frac{p(Q = s | A = \text{yes}, e) \leftrightarrow p(A = \text{yes} | e)}{p(Q = s | e)} \cup$$

$$\frac{p(Q = s | A = \text{yes}) \leftrightarrow p(A = \text{yes} | e)}{p(Q = s | e)}$$

The approximation utilizes the fact that causes and actions are closely related by approximating $p(Q=s|A=\text{yes},e)$ with $p(Q=s|A=\text{yes})$ and thereby ignoring any influence from previous evidence e. This is a good approximation as when it is known that a specific action A solves the problem, it is also known that with high probability one of the causes solved by A is the true cause. Due to the single-fault assumption, having high probability on one cause directly implies a very low probability on the remaining causes, thus the causes are approximately fixed in either their "yes" or "no" states. As actions are d-separated from questions when the causes are given, it is seen that any extra information on other questions or actions has very little influence on the question Q when A is given in its "yes" state.

Empirical evidence supports this, as in the models constructed during the SACSO project, there have been 1.9 causes solved per actions on the average, meaning that all probability mass will be concentrated on 1 or 2 causes when an action is known to solve the problem.

For the dataflow model, the approximation in Equation 12 allows the computation of $ECO_Q$ for all questions to be performed in less than one second in the dataflow model.

In Heckerman et al. 1995's algorithm, the roles of actions and questions are different. Actions can solve the problem and terminate the troubleshooting process if successful. Questions can only provide information for the troubleshooting process and are unable to terminate the process. Thus, a question is useless, if there are no actions left.

This is not optimal, as questions (or information gathering actions) can sometimes identify the cause which corresponds to an action solving the problem. When the cause is identified, it is almost always self-evident what should be done to resolve the problem, and there are (probably) no further actions that can be suggested by the automated troubleshooter.

To obtain the goal that questions (and information gathering actions) can be treated equally with solution actions in the Heckerman et al. 1995 algorithms, it is necessary to find an expression for the probability that a question identifies a cause which can be compared with the probability that an action solves the problem.

The probability that a question Q (or information gathering action) identifies the cause can be expressed as a maximization over the causes and the states of the question, as set out in Equation 13 below:

$$p_{Qid\,c} = \max_C \max_s \frac{p(C = y \mid Q = s) - p(C = y)}{1 - p(C = y)} \leftrightarrow p(Q = s) \quad \text{Equation 13}$$

Equation 13 identifies the cause C and the state s of Q, for which the probability of identifying C when observing Q in the state s is the highest possible when considering all causes and all states of Q.

The first term in Equation 13 (the fraction) intuitively describes the increase in the probability of the cause when observing Q=s relative to the possible increase in the probability from the current to 1. The relative increase will thus be a number between 0 and 1.

The relative increase must be multipled with the probability that the answer s to the question Q will actually be gotten. If this probability is small, the probability of identifying cause C by observing question Q in state s is equally small.

By computing the probabilities of questions identifying causes as defined in Equation 13, it is possible to handle questions (and information gathering actions) the same way as solution actions in the Heckerman et al. 1995 algorithm. As mentioned earlier, the actions are sorted with their ratios $p_i/C_i$, where $p_i$ is the probability that they solve the problem. If the probability of a question solving the problem is taken to be the probability of the question identifying a cause, $p_j = p_{Q\,id\,C}$, the questions similar to the actions can be directly treated and sorted in the same sequence. The questions also can be treated similar to actions when computing the expected cost of an optimal sequence of actions and questions.

Much is gained by this idea—in the Heckerman et al. 1995 algorithm the handling of questions is myopic (i.e., only one step ahead). With this method it is obtained limited n-step lookahead as the questions can be located anywhere in the optimal sequence. It is not complete n-step lookahead, as only the probability of a question identifying the cause is considered—and not the ability of the question to provide valuable information that can allow a more optimal troubleshooting sequence.

Something is also gained in the situation where there are questions (or information gathering actions) left, but no solution actions. In this situation, the Heckerman et al. 1995 algorithm stops, even if one of the questions can identify the cause. This addition to the algorithm will proceed asking questions as long as they help focusing on the cause.

In the Heckerman et al. 1995 algorithm, a question is suggested if it makes sufficient impact on the optimal troubleshooting sequence such that a lower expected cost is gotten than if the question was not asked. For instance, a question is relevant to ask if asking it will swap actions 4 and 5 in the optimal sequence, and thus gives a lower expected cost of the sequence. However, the troubleshooting process that results from this rule is confusing, as it can ask questions that will not have an effect in the next multiple steps.

One way to alleviate this is to allow a question to be asked only if it can potentially make a difference in the next suggested step. This is easily implemented, and gives a more coherent and intuitive troubleshooting process seen from the viewpoint of the user.

This change of the algorithm while providing the user more logical sequences, reduces the optimality, as it is not allowed to ask questions that can rearrange the actions further into the future. Thus, on the average slightly longer and more costly sequences are gotten, though the steps come in a seemingly more logical sequence.

These are the assumptions underlying the modeling of problem domains and the knowledge acquisition (authoring) process.

The first is a single-fault assumption. In general, it is assumed that there is always only a single fault in the complete system. This assumption is important for the validity of the troubleshooting algorithms and also for the knowledge acquisition process. If probabilities were to be assessed for any combination of faults in the system, the domain experts would be working overtime for several years in even small problem domains. It is possible to lift the single-fault assumption in simple cases, though, as described above. These situations have to be clearly identified in each case, and probabilities for the combination of causes have to be assessed. When the single-fault assumption is lifted in these few, specific cases, the troubleshooting algorithms described above will no longer be optimal, but they will still work approximately towards the most likely cause, then correct this, and work towards the next-most likely cause.

The second assumption underlying the modeling of problem domains and the knowledge acquisition (authoring) process is the independence of causes. It is assumed that causes occur independently from each other. This makes the knowledge acquisition a much simpler process as it is not necessary to consider dependences between causes. This also implies that there can be no causal relationships between causes, e.g., causes that can cause other causes, etc. This does not always hold in practice, even though it in general seems to be an adequate assumption. For instance, there is a causal relationship between the printer toner cartridge and other components inside the printer which it can leak on if it is broken. It could be beneficial to model such a relationship, but it is not easily done in the current framework.

The third assumption underlying the modeling of problem domains and the knowledge acquisition (knowledge acquisition) process is persistence. In general, it is assumed that performing actions does not change the environment or the configuration of the system under consideration, and that observations remain valid. It has been described above how to handle simple cases where this assumption does not hold.

A fourth assumption is the additivity of cost components. It is assumed that the four components of cost (time, risk, money and insult) are additive. So far, it is the experience that this assumption is adequate at least when relatively narrow intervals of cost factors are used. If larger intervals are used, linearity probably does not hold—e.g., the time component increases exponentially (100 minutes is more than twice as bad as 50 minutes), and the money component sub-exponentially (1000 dollars is less than twice as bad as 500 dollars).

A fifth assumption is that there are no lies. When acquiring probabilities for actions and questions, it is assumed that users give the answers that they believe are correct. It is assumed that they never knowingly give answers that are incorrect. This assumption doesn't necessarily hold in real-world situations, but it is important for knowledge acquisition as it will be much harder to give probabilities taking this possibility into account.

We claim:

1. A Bayesian network that models a system component causing failure of a system, the Bayesian network comprising:

an indicator node that has a state that indicates whether the system component is causing a failure;

a plurality of cause nodes, coupled to the indicator node, each cause node in the plurality of cause nodes representing a cause of the system component producing a failure; and, a first plurality of troubleshooting nodes, each troubleshooting node representing a troubleshooting step, each troubleshooting node being coupled to at least one cause node from the plurality of cause nodes, each troubleshooting step suggesting an action to remedy causes represented by any cause nodes to which the troubleshooting node is coupled.

2. A Bayesian network as set out in claim 1, additionally comprising:

a question node, the question node being coupled to at least one cause node from the plurality of cause nodes, the question node representing a question, which when answered, provides potential information about causes represented by any cause nodes to which the question node is coupled.

3. A Bayesian network as set out in claim 1, wherein the plurality of cause nodes are coupled to the indicator node through a causes node which represents a probability distribution over causes for failure of the system component.

4. A Bayesian network as set out in claim 3, additionally comprising:

a question node, the question node being coupled to the causes node, the question node representing a question of a general type which is not necessarily related to a symptom or a cause of failure of the system component.

5. A Bayesian network as set out in claim 1 wherein for a first troubleshooting step suggesting a first action, when calculating whether the first action will solve a first cause, utilizing an inaccuracy factor, the inaccuracy factor representing a probability that a user will incorrectly perform the first action.

6. A Bayesian network as set out in claim 1 wherein at least two cause nodes, from the plurality of cause nodes, have a common subcause.

7. A printing diagnosis system comprising:

a first Bayesian network that handles all errors where a customer does not get output from a printer when attempting to print, and where the customer gets corrupted output;

a second Bayesian network that handles all errors where the customer gets unexpected output;

a third Bayesian network that handles all types of error-codes that can be seen on a control panel of the printer; and, a fourth Bayesian network that handles miscellaneous erroneous behavior of the printer not covered by the first Bayesian network, the second Bayesian network and the third Bayesian network.

8. A printing diagnosis system as in claim 7, additionally comprising:

a fifth Bayesian network that represents all possible settings in a printing system for the printer.

9. A method for performing knowledge acquisition used to troubleshoot a system, the method comprising the following steps:

(a) identifying an issue to troubleshoot;

(b) identifying causes of the issue;

(c) identifying subcauses of the causes;

(d) identifying troubleshooting steps;

(e) matching troubleshooting steps to causes and subcauses;

(f) estimating probabilities for the causes identified in step (b) and the subcauses identified in step (c);

(g) estimating probabilities for actions and questions set out in the troubleshooting steps; and, (h) estimating costs for actions and questions set out in the troubleshooting steps.

10. A method as in claim 9 wherein in step (d) each troubleshooting step involves an action in one of the following categories:

(a) a solution action that provides an action that may solve the issue; and, (b) an information gathering action.

11. A method as in claim 9 additionally comprising the following step:

(i) identifying actions and questions, set out in the troubleshooting steps, that require special handling.

12. A method as in claim 9 wherein in step (b) domain experts are used to identify causes of the issue.

13. A method as in claim 9 wherein in step (d) troubleshooting steps include:

actions that can solve any of the causes or subcauses; and, questions that provide additional information about causes or subcauses.

14. A method as in claim 13 wherein in step (e) each troubleshooting step that includes an action is matched to any cause or subcause the action can solve and each troubleshooting step that includes a question is matched to any cause or subcause to which the question is related.

15. A method as in claim 9 wherein when new causes are identified in performing steps (c), (d) and (e), steps (b) through (e) are repeated for the new causes.

16. A method as in claim 9 wherein when new troubleshooting steps are identified in performing step (e), steps (d) and (e) are repeated for the new troubleshooting steps.

17. A method as in claim 9 wherein step (g) comprises the following substeps:

(g.1) determining for each related cause or related subcause a first probability that indicates whether performing a first action correctly will solve the issue; and (g.2) determining a second probability that indicates a likelihood a customer will perform the first action correctly.

18. A method as in claim 17 wherein step (g) additionally comprises the following substep:
 (g.3) combining the first probability and the second probability to determine whether instructing the customer to perform the first action will result in the issue being solved.

19. A method as in claim 9 wherein in step (h), costs for a first action include factors that take into account the following:
 time to perform the first action;
 risk of breaking something when performing the first action;
 amount of money required to purchase any parts necessary to perform the first action; and,
 degree of insult a user may experience when the first action is suggested.

20. A method as in claim 9 wherein in step (h), costs for a first action include a factor that take into account a degree of insult a user may experience when the first action is suggested.

21. A method as in claim 9 wherein in step (h), costs for a first action include a factor that take into account risk of breaking something when performing the first action.

22. A method as in claim 9 additionally comprising the following step:
 (i) identifying actions and questions, set out in the troubleshooting steps, that require special handling, the actions and questions that require special handling including at least one of the following:
  initial steps that identify default causes that should be ruled out initially;
  workarounds which may solve a problem, in a way that may not be satisfactory to a user;
  information pertaining to replacement of components;
  information pertaining to irreversible actions;
  information pertaining to included actions;
  information pertaining to special-case steps; and,
  information pertaining to persistence of old observations as to whether the old obserservations are rendered invalid by later performed actions.

23. A dataflow model of a print job comprising:
 a first Bayesian network model representing how a file can cause erroneous printer output;
 a second Bayesian network model, coupled to the first Bayesian network, representing how an application can cause erroneous printer output;
 a third Bayesian network model, coupled to the second Bayesian network, representing how a printer driver can cause erroneous printer output;
 a fourth Bayesian network model, coupled to the third Bayesian network, representing how a spooler can cause erroneous printer output;
 a fifth Bayesian network model, coupled to the fourth Bayesian network, representing how operating system redirect code can cause erroneous printer output;
 a sixth Bayesian network model, coupled to the fifth Bayesian network, representing how a network driver can cause erroneous printer output;
 a seventh Bayesian network model, coupled to the sixth Bayesian network, representing how a network card can cause erroneous printer output;
 a eighth Bayesian network model, coupled to the seventh Bayesian network, representing how a first network connection can cause erroneous printer output;
 a ninth Bayesian network model, coupled to the eighth Bayesian network, representing how a server can cause erroneous printer output;
 a tenth Bayesian network model, coupled to the ninth Bayesian network, representing how a queue can cause erroneous printer output;
 a eleventh Bayesian network model, coupled t o the tenth Bayesian network, representing how a second network connection can cause erroneous printer output;
 a twelfth Bayesian network model, coupled to the eleventh Bayesian network, representing how printer hardware can cause erroneous printer output;
 a thirteenth Bayesian network model, coupled to the twelfth Bayesian network, representing how the printer hardware output can cause erroneous printer output;
 a fourteenth Bayesian network model, coupled to the fifth Bayesian network, representing how a local parallel cable can cause erroneous printer output;
 a fifteenth Bayesian network model, coupled to the fourteenth Bayesian network, representing how a switchbox can cause erroneous printer output; and,
 a sixteenth Bayesian network model, coupled to the fifth Bayesian network, representing how a third network connection can cause erroneous printer output;
 wherein the twelfth Bayesian network model is also coupled to the fifteenth Bayesian network model and the sixteenth Bayesian network model.

24. A Bayesian network that models dataflow through a system, the Bayesian network comprising:
 an indicator node that has a state that indicates whether there is a failure in dataflow;
 a dataflow components node defining all components of the data flow;
 a plurality of component indicator nodes, a state of each component indicator node representing whether failure in the dataflow is due to an associated component;
 a plurality of flow nodes presenting data flow through the components;
 a plurality of global troubleshooting nodes, each global troubleshooting node being associated with at least one of the plurality of component indicator nodes or at least one of the flow nodes, each global troubleshooting node providing a global troubleshooting step;
 a first plurality of troubleshooting nodes, each troubleshooting node representing a troubleshooting step, each troubleshooting node being coupled to at least one cause node from the plurality of cause nodes, each troubleshooting step suggesting an action to remedy causes represented by any cause nodes to which the troubleshooting node is coupled; and,
 a plurality of component network nodes, each of the component network nodes representing a Bayesian network modeling causes of an associated component.

25. A Bayesian network as in claim 24 wherein each component network node in the plurality of component network nodes includes local troubleshooting steps for the associated component.

26. A method for troubleshooting a problem within a system, the method comprising the following steps performed by an automated troubleshooter:
 (a) identifying the problem;
 (b) selecting one of any remaining actions or remaining questions;
 (c) when in step (b) a remaining question is selected, performing the following substeps:
  (c.1) asking a user the selected remaining question,
  (c.2) receiving any answer provided by the user, (c.3) if there are no more actions or questions terminating the troubleshooter as unsuccessfully fixing the problem, and
(c.4) if there are more actions or questions, returning to step (b); and,
(d) when in step (b) a remaining action is selected, performing the following substeps:
(d.1) performing the selected remaining action,
(d.2) determining whether the problem is solved,
(d.3) if performing the selected remaining action solved the problem, terminating the troubleshooter as successfully fixing the problem, and
(d.4) if performing the selected remaining action did not solve the problem, performing the following substeps:
(d.4.1) if there are no more actions or questions terminating the troubleshooter as unsuccessfully fixing the problem, and
(d.4.2) if there are more actions or questions, returning to step (b);
wherein step (b) includes:
calculating expected cost of repair (ECR) for performing an optimal action,
calculating expected cost of observation (ECO) for asking an optimal question, and
selecting on the basis of ECR and ECO, one of the optimal actions and the optional question; and,
wherein when calculating ECO and ECR, taking into account that when an action that can solve multiple causes fails, probabilities of each of the multiple causes decreases and probabilities of other remaining causes increases accordingly such that a sum of cause probabilities is still 1.

27. A method for troubleshooting a problem within a system, the method comprising the following steps performed by an automated troubleshooter:
(a) identifying the problem;
(b) selecting one of any remaining actions or remaining questions;
(c) when in step (b) a remaining question is selected, performing the following substeps:
(c.1) asking a user the selected remaining question,
(c.2) receiving any answer provided by the user,
(c.3) if there are no more actions or questions terminating the troubleshooter as unsuccessfully fixing the problem, and
(c.4) if there are more actions or questions, returning to step (b); and,
(d) when in step (b) a remaining action is selected, performing the following substeps:
(d.1) performing the selected remaining action,
(d.2) determining whether the problem is solved,
(d.3) if performing the selected remaining action solved the problem, terminating the troubleshooter as successfully fixing the problem, and
(d.4) if performing the selected remaining action did not solve the problem, performing the following substeps:
(d.4.1) if there are no more actions or questions terminating the troubleshooter as unsuccessfully fixing the problem, and
(d.4.2) if there are more actions or questions, returning to step (b);
wherein step (b) includes:
calculating expected cost of repair (ECR) for performing an optimal action,
calculating expected cost of observation (ECO) for asking an optimal question,
selecting on the basis of ECR and ECO, one of the optimal action and the optional question, and
wherein when calculating ECR, using the following algorithm:
find first action $A_1$ as action with highest $P_i/C_i$
for i=0 to #actions
recompute probabilities of causes assuming $A_{i-1}$=no (fails)
find action $A_i$ as action with highest $p(A_i=yes|A_1=no, \ldots, A_{i-1}=no)/C_i$.

28. A method for troubleshooting a problem within a system, the method comprising the following steps performed by an automated troubleshooter:
(a) identifying the problem;
(b) selecting one of any remaining actions or remaining questions;
(c) when in step (b) a remaining question is selected, performing the following substeps:
(c.1) asking a user the selected remaining question,
(c.2) receiving any answer provided by the user,
(c.3) if there are no more actions or questions terminating the troubleshooter as unsuccessfully fixing the problem, and
(c.4) if there are more actions or questions, returning to step (b); and,
(d) when in step (b) a remaining action is selected, performing the following substeps:
(d.1) performing the selected remaining action,
(d.2) determining whether the problem is solved,
(d.3) if performing the selected remaining action solved the problem, terminating the troubleshooter as successfully fixing the problem, and
(d.4) if performing the selected remaining action did not solve the problem, performing the following substeps:
(d.4.1) if there are no more actions or questions terminating the troubleshooter as unsuccessfully fixing the problem, and
(d.4.2) if there are more actions or questions, returning to step (b);
wherein step (b) includes:
calculating expected cost of repair (ECR) for performing an optimal action,
calculating expected cost of observation (ECO) for asking an optimal question,
selecting on the basis of ECR and ECO, one of the optimal action and the optional question, and
wherein when calculating ECO, approximating probabilities of actions solving a problem $p(A=yes|Q=s, e)$ given observation of a question Q in state s utilizing the following equation:

$$p(A = yes | Q = s, e) = \frac{p(Q = s | A = yes, e) \leftrightarrow p(A = yes | e)}{p(Q = s | e)} \cup$$

$$\frac{p(Q = s | A = yes) \leftrightarrow p(A = yes | e)}{p(Q = s | e)}$$

29. A method for troubleshooting a problem within a system, the method comprising the following steps performed by an automated troubleshooter:
(a) identifying the problem;
(b) selecting one of any remaining actions or remaining questions;

(c) when in step (b) a remaining question is selected, performing the following substeps:
  (c.1) asking a user the selected remaining question,
  (c.2) receiving any answer provided by the user,
  (c.3) if there are no more actions or questions terminating the troubleshooter as unsuccessfully fixing the problem, and
  (c.4) if there are more actions or questions, returning to step (b); and,
(d) when in step (b) a remaining action is selected, performing the following substeps:
  (d.1) performing the selected remaining action,
  (d.2) determining whether the problem is solved,
  (d.3) if performing the selected remaining action solved the problem, terminating the troubleshooter as successfully fixing the problem, and
  (d.4) if performing the selected remaining action did not solve the problem, performing the following substeps:
    (d.4.1) if there are no more actions or questions terminating the troubleshooter as unsuccessfully fixing the problem, and
    (d.4.2) if there are more actions or questions, returning to step (b);
wherein step (b) includes:
  calculating expected cost of repair (ECR) for performing an optimal action,
  calculating expected cost of observation (ECO) for asking an optimal question,
  selecting on the basis of ECR and ECO, one of the optimal action and the optional question, and
  wherein when calculating ECO, using an expression for a probability that a question Q identifies a cause which can be compared with a probability that an action solves the problem, the expression identifying a cause being expressed as a maximization over causes and states of the question Q, the expression being set out below:

$$p_{Qid\,c} = \max_C \max_s \frac{p(C = y \mid Q = s) - p(C = y)}{1 - p(C = y)} \leftrightarrow p(Q = s)$$

30. A method for troubleshooting a problem within a system, the method comprising the following steps performed by an automated troubleshooter:
(a) identifying the problem;
(b) selecting one of any remaining actions or remaining questions;
(c) when in step (b) a remaining question is selected, performing the following substeps:
  (c.1) asking a user the selected remaining question,
  (c.2) receiving any answer provided by the user,
  (c.3) if there are no more actions or questions terminating the troubleshooter as unsuccessfully fixing the problem, and
  (c.4) if there are more actions or questions, returning to step (b); and,
(d) when in step (b) a remaining action is selected, performing the following substeps:
  (d.1) performing the selected remaining action,
  (d.2) determining whether the problem is solved,
  (d.3) if performing the selected remaining action solved the problem, terminating the troubleshooter as successfully fixing the problem, and
  (d.4) if performing the selected remaining action did not solve the problem, performing the following substeps:
    (d.4.1) if there are no more actions or questions terminating the troubleshooter as unsuccessfully fixing the problem, and
    (d.4.2) if there are more actions or questions, returning to step (b);
wherein in step (b) a question is asked only if it can potentially make a difference in a next selected troubleshooting step.

31. A method for performing knowledge acquisition to be used by an expert system to troubleshoot a product, the method comprising the following steps:
(a) identifying an issue to troubleshoot;
(b) identifying causes of the issue;
(c) identifying subcauses of the causes;
(d) identifying troubleshooting steps;
(e) matching troubleshooting steps to causes and subcauses;
(f) estimating probabilities for the causes identified in step (b) and the subcauses identified in step (c);
(g) estimating probabilities for actions and questions set out in the troubleshooting steps; and,
(h) estimating costs for actions and questions set out in the troubleshooting steps.

32. An expert system comprising:
a Bayesian network that models a system component causing failure of a system, the Bayesian network including:
  an indicator node that has a state that indicates whether the system component is causing a failure;
  a plurality of cause nodes, coupled to the indicator node, each cause node in the plurality of cause nodes representing a cause of the system component producing a failure; and,
  a first plurality of troubleshooting nodes, each troubleshooting node representing a troubleshooting step, each troubleshooting node being coupled to at least one cause node from the plurality of cause nodes, each troubleshooting step suggesting an action to remedy causes represented by any cause nodes to which the troubleshooting node is coupled.

33. An expert system as set out in claim 32, wherein the Bayesian network additionally includes:
a question node, the question node being coupled to at least one cause node from the plurality of cause nodes, the question node representing a question, which when answered, provides potential information about causes represented by any cause nodes to which the question node is coupled.

34. An expert system as set out in claim 32, wherein the plurality of cause nodes are coupled to the indicator node through a causes node which represents a probability distribution over causes for failure of the system component.

35. An expert system as set out in claim 34, wherein the Bayesian network additionally includes:
a question node, the question node being coupled to the causes node, the question node representing a question of a general type which is not necessarily related to a symptom or a cause of failure of the system component.

36. An expert system as set out in claim 32 wherein for a first troubleshooting step suggesting a first action, when calculating whether the first action will solve a first cause, utilizing an inaccuracy factor, the inaccuracy factor representing a probability that a user will incorrectly perform the first action.

37. An expert system as set out in claim 32 wherein at least two cause nodes, from the plurality of cause nodes, have a common subcause.

* * * * *

UNITED STATES PATENT AND TRADEMARK OFFICE
CERTIFICATE OF CORRECTION

PATENT NO.    : 6,535,865 B1
DATED         : March 18, 2003
INVENTOR(S)   : Claus Skaanning et al.

It is certified that error appears in the above-identified patent and that said Letters Patent is hereby corrected as shown below:

<u>Title page,</u>
Item [75], Inventors, "Claus Skaaning" should read -- Claus Skaanning --, and "Janice L. Boborad" should read -- Janice L. Bogorad --.

<u>Column 1,</u>
Line 7, "Skaaning" should read -- Skaanning --.

<u>Column 3,</u>
Line 12, "," should read -- . --.
Line 41, " $\substack{n \\ i=1} p_i = 1$ " should read -- $\sum_{i=1}^{n} p_i = 1$ --.

<u>Column 14,</u>
Line 64, "ident_ied" should read -- identified --.

<u>Column 15,</u>
Line 34, "elicication" should read -- elicitation --.

<u>Column 16,</u>
Table 7, entry 7) a), "Econoniode" should read -- Economode --.

<u>Column 17,</u>
Line 53, "analysing" should read -- analyzing --.

<u>Column 25,</u>
Line 30, "spoller" should read -- spooler --.
Lines 31 and 34, "prolbem" should read -- problem --.
Line 48, "pring" should read -- printing --.
Line 51, "troubleshotting" should read -- troubleshooting --.
Line 60, "definining" should read -- defining --.

<u>Column 28,</u>
Line 27, "repressents" should read -- represents --.
Line 30, "represnts" should read -- represents --.
Line 48, "Node 28" should read -- Node 628 --.

<u>Column 29,</u>
Line 65, "eror" should read -- error --.

<u>Column 36,</u>
Line 9, "and and" should read -- and --.

UNITED STATES PATENT AND TRADEMARK OFFICE
CERTIFICATE OF CORRECTION

PATENT NO. : 6,535,865 B1
DATED : March 18, 2003
INVENTOR(S) : Claus Skaanning et al.

It is certified that error appears in the above-identified patent and that said Letters Patent is hereby corrected as shown below:

Column 41,
Line 41, "multipled" should read -- multiplied --.

Column 45,
Line 38, "obserservations" should read -- observations --.

Signed and Sealed this

Eighth Day of July, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,535,865 B1  Page 1 of 1
DATED : March 18, 2003
INVENTOR(S) : Claus Skaanning et al.

It is certified that error appears in the above-identified patent and that said Letters Patent is hereby corrected as shown below:

<u>Title page,</u>
Item [75], Inventors, delete "Skaaning," and insert therefor:
-- Skaanning --; and delete "Boborad," and insert therefor:
-- Bogorad --

Signed and Sealed this

Eighth Day of June, 2004

JON W. DUDAS
*Acting Director of the United States Patent and Trademark Office*